United States Patent [19]
Nakamura et al.

[11] Patent Number: 5,327,190
[45] Date of Patent: Jul. 5, 1994

[54] AUTOMATIC FOCUSING DEVICE

[75] Inventors: Kimihiko Nakamura, Osaka; Masataka Hamada, Osakasayama, both of Japan

[73] Assignee: Minolta Camera Kabushiki Kaisha, Osaka, Japan

[21] Appl. No.: 889,359

[22] Filed: May 28, 1992

[30] Foreign Application Priority Data

May 28, 1991 [JP] Japan ................................. 3-124037

[51] Int. Cl.[5] ............................................ G03B 13/36
[52] U.S. Cl. ..................................................... 354/402
[58] Field of Search ......................................... 354/402

[56] References Cited
U.S. PATENT DOCUMENTS 5,138,356  8/1992  Nakamura et al. ................. 354/402

Primary Examiner—W. B. Perkey
Attorney, Agent, or Firm—Burns, Doane, Swecker & Mathis

[57] ABSTRACT

A defocus amount of an object is detected by a focus detection unit of a camera, whereby a defocus velocity is calculated according to the detected amount. An average velocity is calculated using a plurality of defocus velocities and then a smoothing velocity is calculated, whereby a reversed position of a velocity direction is detected using the data. An average velocity, a smoothing velocity, and the time of a velocity direction reversed are calculated, whereby a correction velocity is obtained according to the calculation. A driving amount of lens is calculated according to the calculated correction velocity, whereby the photographic lens is driven by the lens driving device so as to follow the moving of an object.

8 Claims, 28 Drawing Sheets

FIG. 4

| PATTERN | MOVEMENT |
|---|---|
| MOVING AWAY AND THEN COMING CLOSER U TURN | ⤵︎ |
| COMING CLOSER AND THEN MOVING AWAY U TURN | ⤴︎ |
| TRAVERSING | ↑ |
| MOVING FARTHER AWAY FROM A STATIONARY STATE | ←⊣ |
| MOVING FARTHER AWAY AND STOPS | ⊢← |
| MOVING FARTHER AWAY | ← |
| COMING CLOSER FROM A STATIONARY STATE | ⊢→ |
| COMING CLOSER AND STOPS | →⊣ |
| COMING CLOSER | → |

PATTERNS OF MOVING OBJECT

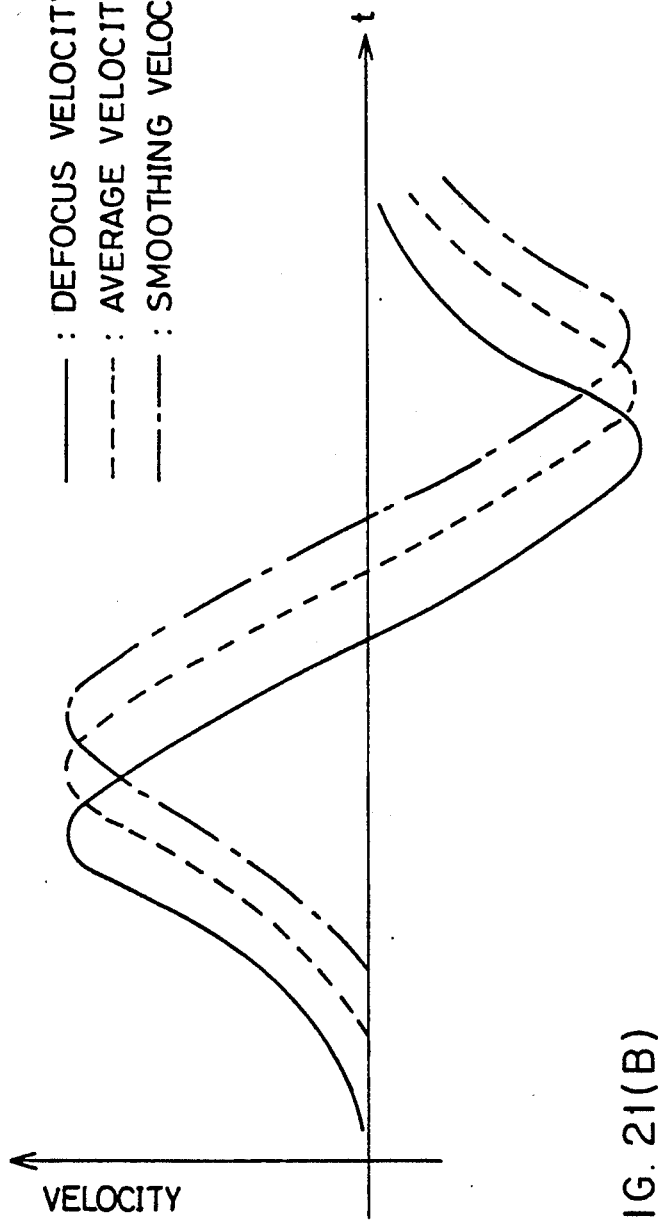

FIG. 23

| | ONE SHOT | STATIONARY DETECTION | MAL CONTINUOUS | AF LOCK |
|---|---|---|---|---|
| EYE-PIECE CONTINUOUS | \|Vave\| <1mm/s<br>\|Vave-1\| <1mm/s<br>⋮<br>\|Vave-4\| <1mm/s | | Vave≥1mm/s<br>Vave<-3mm/s | |
| ONE SHOT | | IN-FOCUS | IN-FOCUS NOT REACHED AFTER 4 TIMES OF LENS DRIVE<br>FOCUS DETECTION CARRIED OUT FOR MORE THAN 8 TIMES AT 1 DRIVE<br>CONTINUOUS INHIBITED CONDITION<br>ACCUMULATION TIME>40ms, β>1/25 | |
| STATIONARY DETECTION | | | LATEST AVERAGE DEFOCUS MORE THAN 400μm<br>-3mm/s Vave or Vave > 1mm/s<br>-3mm/s Vave-1 or Vave-1 >1mm/s<br>-3mm/s Vave-2 or Vave-2 >1mm/s<br>-3mm/s Vave-3 or Vave-3 >1mm/s<br>-3mm/s Vave-4 or Vave-4 >1mm/s<br>CONTINUOUS INHIBITED CONDITION<br>ACCUMULATION TIME>40ms, β>1/25 | COMPLETION OF PREDETERMINED TIMES<br>LATEST AVERAGE DEFOCUS WITHIN 300μm FROM BASE DEFOCUS |

FIG. 24

|  | NORMAL CONTINUOUS | MOVING OBJECT CORRECTION CONTINUOUS | WAIT CONTINUOUS |
|---|---|---|---|
| NORMAL CONTINUOUS |  | · IN-FOCUS→OUT-OF-FOCUS→ OUT-OF-FOCUS→OUT-OF-FOCUS (3 SUCCESIVE TIMES OF OUT-OF-FOCUS AFTER IN-FOCUS) · OUT-OF-FOCUS→IN-FOCUS→ OUT-OF-FOCUS IN-FOCUS NOT CONTINUING Vave>1mm/s, Vave<-3mm/s | LOW CONTRAST LOST OBJECT (OBJECT POSITION 400μm FARTHER) |
| MOVING OBJECT CORRECTION CONTINUOUS | β>1/25 ACCUMULATION TIME>40ms K VALUE >1.0 CCD GAIN ×4 EDGE TERMINAL OF LENS \|Vave\|≧0.75mm/s (VELOCITY CHANGE NOT 0) DRIVING AMOUNT>Vave×32 MORE THAN 20 PULSES WITH DRIVING AMOUNT AT OPPOSITE DIRECTION |  |  |
| WAIT CONTINUOUS | LOW CONTRAST FOR 2 SUCCESSIVE TIMES COMPLETION OF PREDETERMINED TIMES | RESTORED FROM LOST OBJECT STATE/NOT LOW CONTRAST |  |

AUTOMATIC FOCUSING DEVICE

BACKGROUND OF THE INVENTION

1. Field of the Invention

The present invention relates to an automatic focusing device, and more particularly, to an automatic focusing device that can keep an object in an in-focus state even in the case where there is change in the direction of the velocity or acceleration of the object with respect to the camera such as in the case where the object makes an U turn movement in front of the camera.

2. Description of the Related Art

An automatic focusing device is proposed that follows the movement of an object to keep an object in an in-focus state (for example U.S. Pat. No. 4,860,045). This automatic focusing device can keep in an in-focus state for an object that does not change in the direction of velocity or acceleration with respect to the camera.

In such an automatic focusing device it is inhibited to try to keep an object in an in-focus state when the direction of velocity or acceleration of the object with respect to the camera is reversed, such as in the case where an object makes an U turn movement in front of the camera. This is because the movement of the object can not be followed if the focus detecting operation is continued identical to that employed before the object changes its reverse direction of velocity or acceleration.

SUMMARY OF THE INVENTION

An object of the present invention is to provide an automatic focusing device that can keep an object in an in-focus state even when the direction of velocity of the object with respect to the camera is reversed, such as in the case the object makes an U turn movement.

Another object of the present invention is to provide an automatic focusing device that can keep an object in an in-focus state even when the direction of acceleration of the object with respect to the camera is reversed.

A further object of the present invention is to provide an automatic focusing device that can easily detect the point where the direction of acceleration of an object with respect to the camera is reversed.

In the automatic focusing device according to the present invention, the velocity of an object moving towards the camera is detected, whereby an in-focus position of the photographic lens is obtained according to the detected velocity to drive the lens to that in-focus position.

Because the lens is driven towards the in-focus position according to change in velocity of an object, a camera can be provided that can keep an object in an in-focus state for an object even when the direction of velocity of the object with respect to the camera is reversed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows various patterns of a moving object applicable to the present invention.

FIGS. 21(A) and 21(B) is a diagram for describing the method of defining a transition point of a moving object correction zone.

FIGS. 23 and 24 show moving object detection conditions.

DESCRIPTION OF THE PREFERRED EMBODIMENTS (1) First Embodiment

An embodiment of the present invention will be described hereinafter with reference to the drawings.

Figure 1:
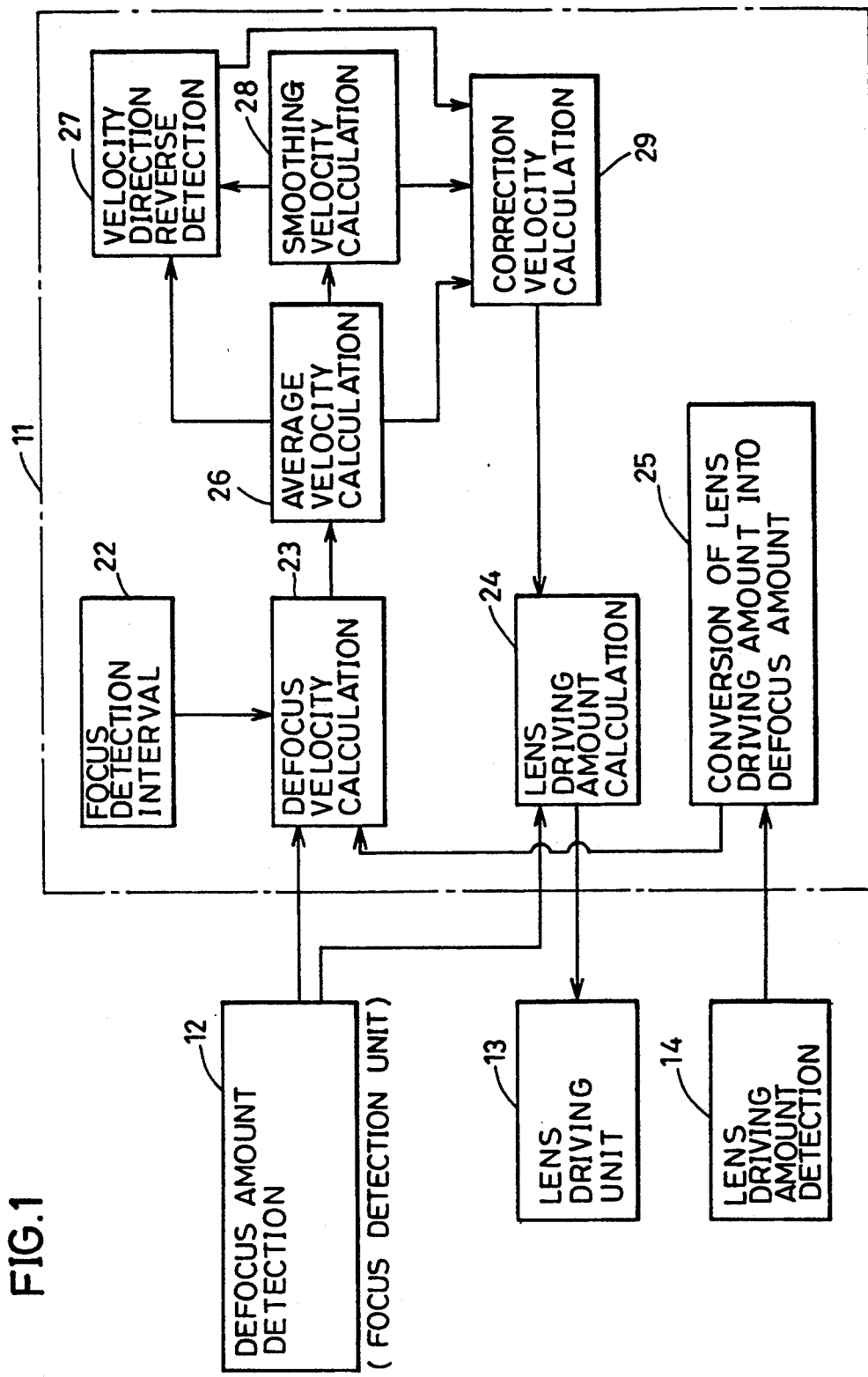
FIG. 1 is a block diagram showing the components of an automatic focusing device according to the present invention.

Referring to FIG. 1, an automatic focusing device according to the present invention includes a CPU 11 for overall program, a focus detection unit 12 connected to CPU 11 for detecting the focus of an object and the amount of defocus thereof, a lens driving device 13 for driving a photographic lens so as to decrease the defocus amount according to the amount of defocus detected by focus detection unit 12, and a lens driving amount detection device 14 for detecting a lens driving amount.

CPU 11 serves as the following units.

CPU 11 includes a defocus velocity calculation unit 23 for calculating a defocus velocity according to the defocus amount detected from focus detection unit 12, a focus detection interval detection unit 22 for detecting the interval of focus detection, an average velocity calculation unit 26 for calculating an average velocity using the result of defocus velocity calculation unit 23, a smoothing velocity calculation unit 28 for calculating a smoothing velocity according to an average velocity, and a velocity direction inversion detection unit 27 for detecting an inversion of the velocity direction according to an average velocity and a smoothing velocity. CPU 11 further includes a correction velocity calculation unit 29 for calculating a correction velocity according to an average velocity, a smoothing velocity, and data on velocity direction inversion, a lens driving amount calculation unit 24 for calculating a driving amount of the photographic lens according to a correction velocity and a defocus amount, and a conversion unit 25 for converting the lens driving amount from lens driving amount detection device 14 into a defocus amount. The lens driving amount converted into a defocus amount is transmitted to defocus velocity calculation unit 23.

Figure 2:
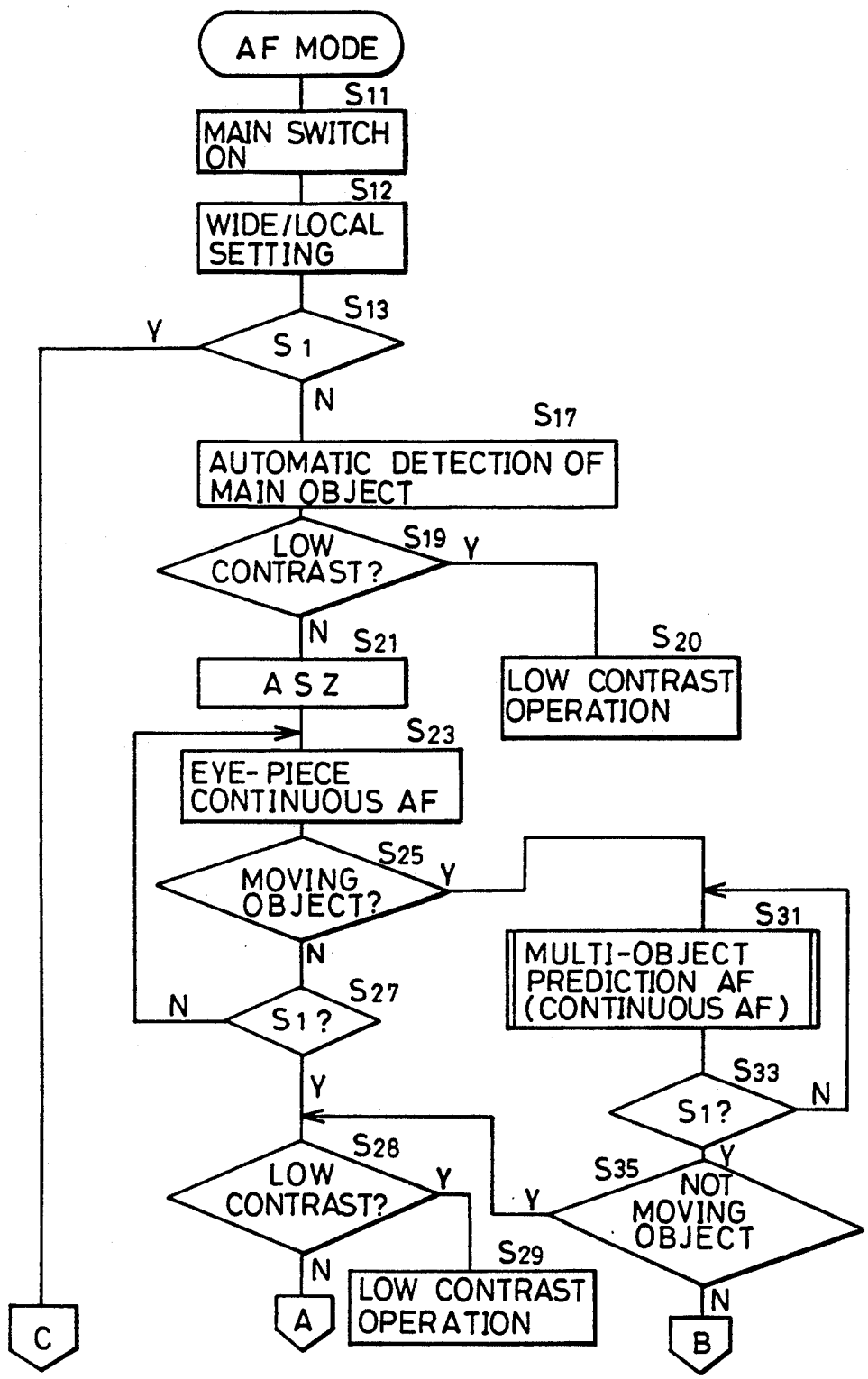
FIGS. 2 and 3 are flow charts showing AF mode.
Figure 3:
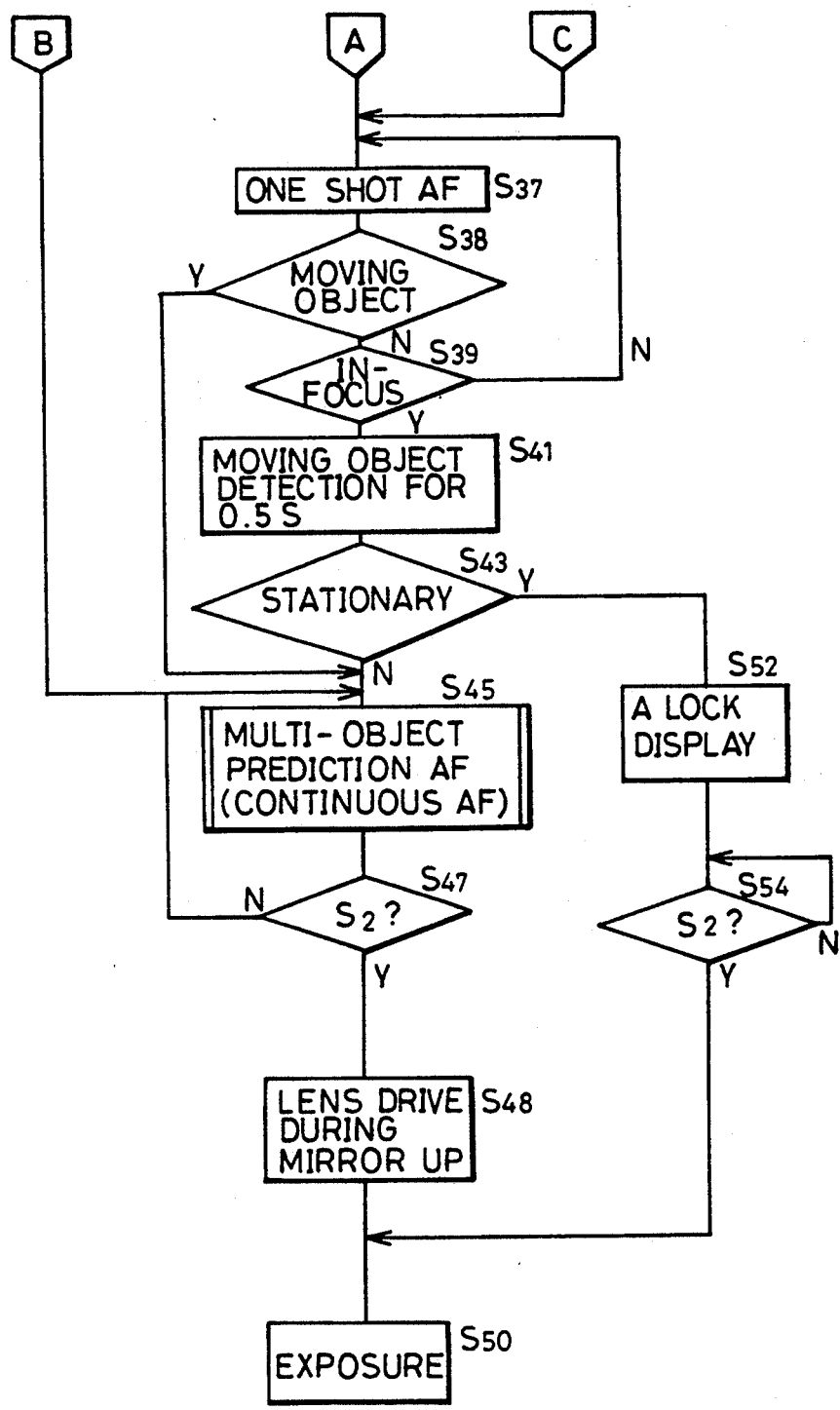

The operation of the automatic focus adjusting device according to the present invention shown in FIG. 1 will be described hereinafter with reference to the flow charts of FIGS. 2 and 3.

When a main switch (not shown) is turned on, the focus detection area is set to either a wide mode or a local mode. With an eye piece detection switch or a pre-exposure focus detection starting switch S1 which is turned on by a first stroke of a release button, the focus detection operation is initiated (step S11, step S12, "step" omitted hereinafter). An eye piece detection switch is located in the eye piece unit, and serves to sense an operator of the camera looking into the finder. A focus detection operation is initiated when an operator looking into the finder is sensed. Then, determination is made whether switch S1 is on or not (S13). If switch S1 is off, the main object is automatically detected (S17). If determination is made that the object is of low contrast (Y at S19), low contrast operation is carried out (S20). If determination is made in S19 that the object is not of low contrast, automatic focal length setting for zooming (ASZ) is carried out according to the distance to the main object (S21). Then, eye piece continuous AF operation is carried out wherein a lens driving velocity is slow (S23).

At S25, determination is made whether the object is moving or not. If Y at S25, multi-moving object prediction AF (referred to as "continuous AF" hereinafter) operation is continued (S31). At S33, determination is made whether switch S1 is on or not. If switch S1 is off (N in S33), multi-moving object prediction A3F is carried out (S31). If switch S1 is on (Y at S33), determination is made whether the object has ceased its movement or not. If determination is made that the object is not moving (Y at S35), the program proceeds to S28. If determination is made that the object is not moving (N at S25), the program proceeds to S27 where determination is made whether switch S1 is on or not. If switch S1 is off (N at S27), the above operation is repeated. If switch S1 is on at S27, the program proceeds to S28 where determination is made whether the object is of low contrast or not. If Y at S28, a low contrast operation is carried out (S29). If the object is not of low contrast (N at S28), a one shot AF operation is carried out (S37).

At S38, determination is made whether the object is moving or not. If Y at S38, the program proceeds to S45 where multi-moving object prediction AF is carried out. If determination is made that the object is not moving at S38, program proceeds to S39 where determination is made whether in-focus state is reached or not. If determination is made that the object is not in-focus (N at S39), the operation of steps S37-S39 is repeated.

If determination is made that in-focus state is reached (Y at S39), a moving object detection is carried out for 0.5 seconds to make determination whether the object is at a stationary state or not (S41-S43).

If determination is made that the object is moving (N at S43), multi-moving object prediction AF operation is carried out. The program then proceeds to S47 where determination is made whether release switch S2 is on or not. Release switch S2 is turned on by a second stroke of a release button.

If switch S2 is on (Y at S47), the photographic lens is driven during the mirror up operation to be in an in-focus position at the start of exposure (S48). The program then proceeds to S50 where exposure is carried out. If determination is made that the object is at a stationary state (Y at S43), AF locking is carried out (S52). Waiting is conducted at S54 for switch S2 to be turned on, whereby an exposure operation is carried out. If determination is made that the object is moving (N at S35) or switch S2 is not on (N at S47), multi-moving object prediction AF operation is carried out (S45).

Figure 22:
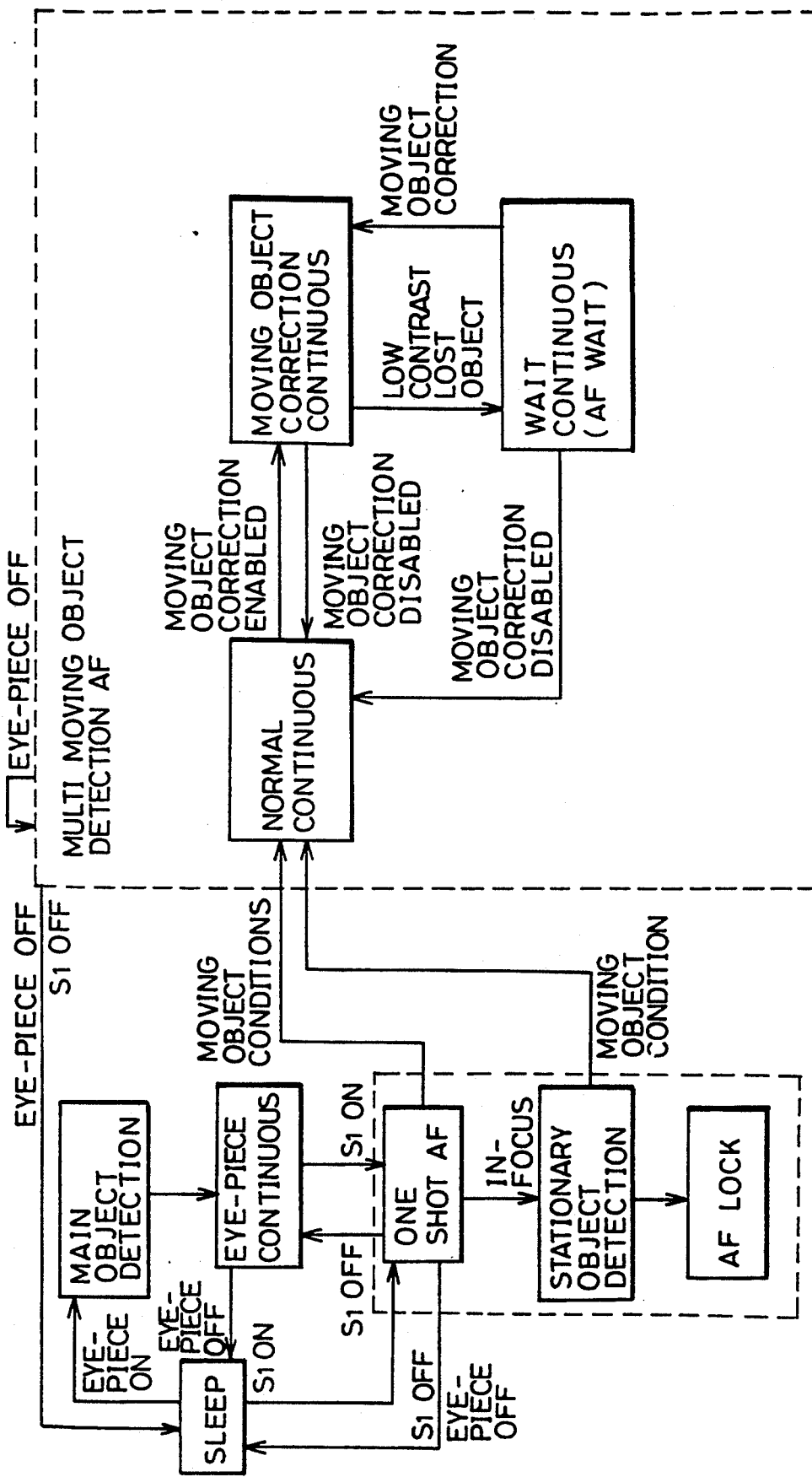
FIG. 22 is a diagram showing the changing state of AF mode.

If determination is made that switch S1 is on (Y at S13), a one shot AF operation is carried out (S37). A transition diagram of the states shown in the flow charts of FIGS. 2 and 3 is shown in FIG. 22. The conditions for determining whether the object is moving or not are shown in FIG. 23 and 24.

Patterns of a moving object applicable to the present invention will be described hereinafter. FIG. 4 shows possible patterns of a moving object. The present invention has applicability to all possible movements of an object such as coming nearer, coming nearer and stopping, coming nearer from a stationary state, moving farther away, moving farther and stopping, moving farther from a stationary state, traversing in front of the camera, coming closer and then moving farther away (U turn) and moving farther and then coming near (reverse U turn).

Figure 5:
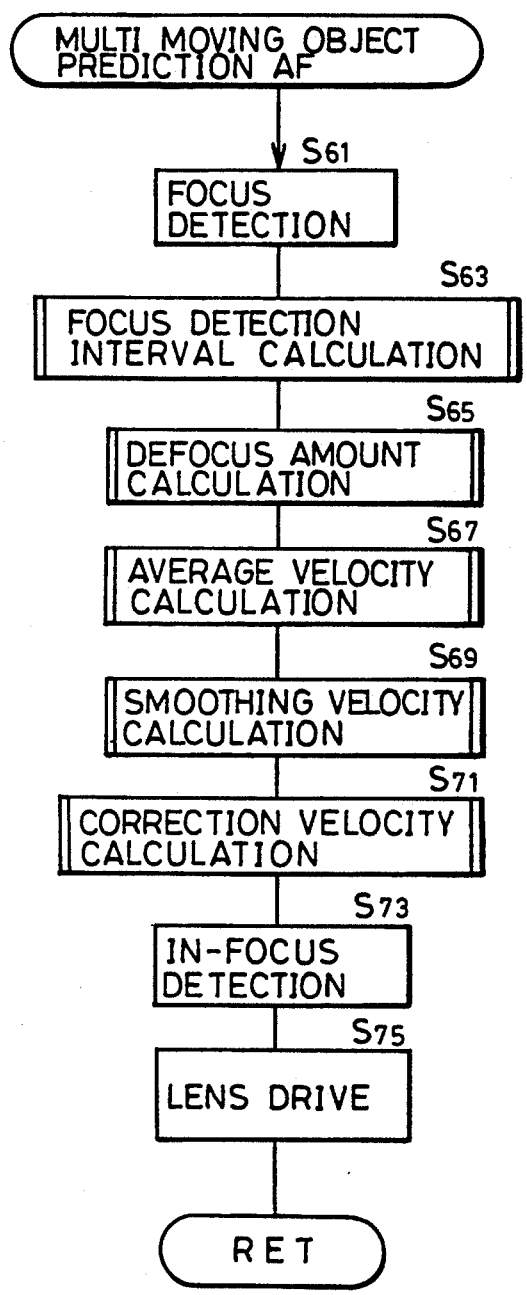
FIG. 5 is a flow chart showing multi-object prediction AF.

The details of a multi-moving object prediction AF operation mentioned in association with FIGS. 2 and 3 will be described hereinafter. FIG. 5 is a flow chart indicating the operation of multi-moving object prediction AF.

Referring to FIG. 5, focus detection is first carried out, followed by the calculation of focus detection interval and defocus velocity (S61-S65). Then, based on a defocus velocity, calculation of an average velocity and a smoothing velocity are carried out (S67, S69). At S71, calculation of a correction velocity for autofocusing is carried out according to the above calculated results. Determination is made whether an in-focus state is reached or not according to the calculated results, whereby the lens is driven to an in-focus position (S73, S75).

Referring to FIGS. 6-17, the contents of each subroutine of the multi-moving object prediction AF operation of FIG. 5 will be described.

Figure 6:
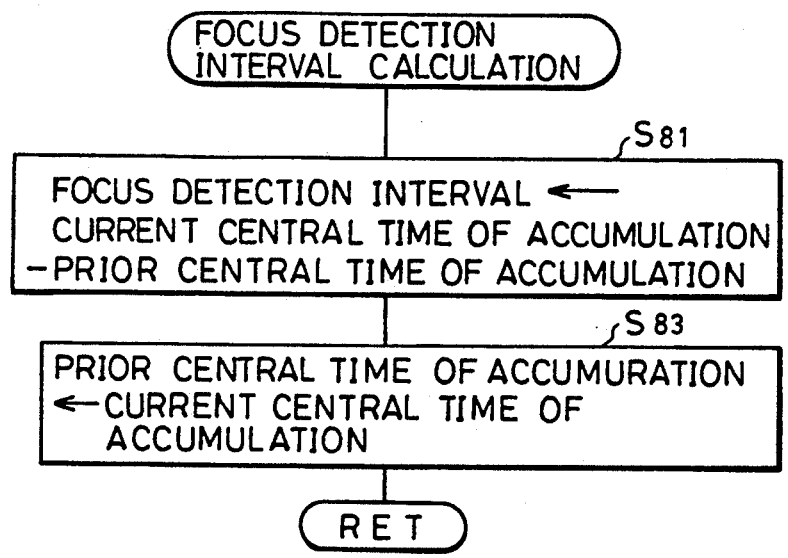
FIG. 6 is a flow chart showing focus detection interval calculation.

The focus detection interval calculation in S63 of FIG. 5 will be described with reference to FIG. 6. In this subroutine, the preceding central time of accumulation is subtracted from the current central time of accumulation to calculate a focus detection interval (S81). Then, the current central time of accumulation is held as the preceding central time of accumulation (S83). The specific focus detection interval will be described afterwards.

The defocus velocity calculation is carried out as follows. The defocus velocity is calculated according to the current defocus amount, the second-prior defocus amount, the defocus amount corresponding to the lens driving amount driven therebetween, and the time required from the second-prior focus detection to the current focus detection. When the defocus velocity is to be calculated using a defocus amount obtained by focus detection during film wind-up, the interval between the prior focus detection and the current focus detection will be sufficient since there is an exposure time period between the prior focus detection and the current focus detection. In the case where focus detection is carried out only during film wind-up such as in the case of continuous photographing, the delay in time due to calculation will become great if the second-prior defocus amount is used. When a defocus velocity is to be calculated using a defocus amount detected during film wind-up, the calculation will be carried out using the current defocus amount and the second-prior defocus amount.

Figure 7:
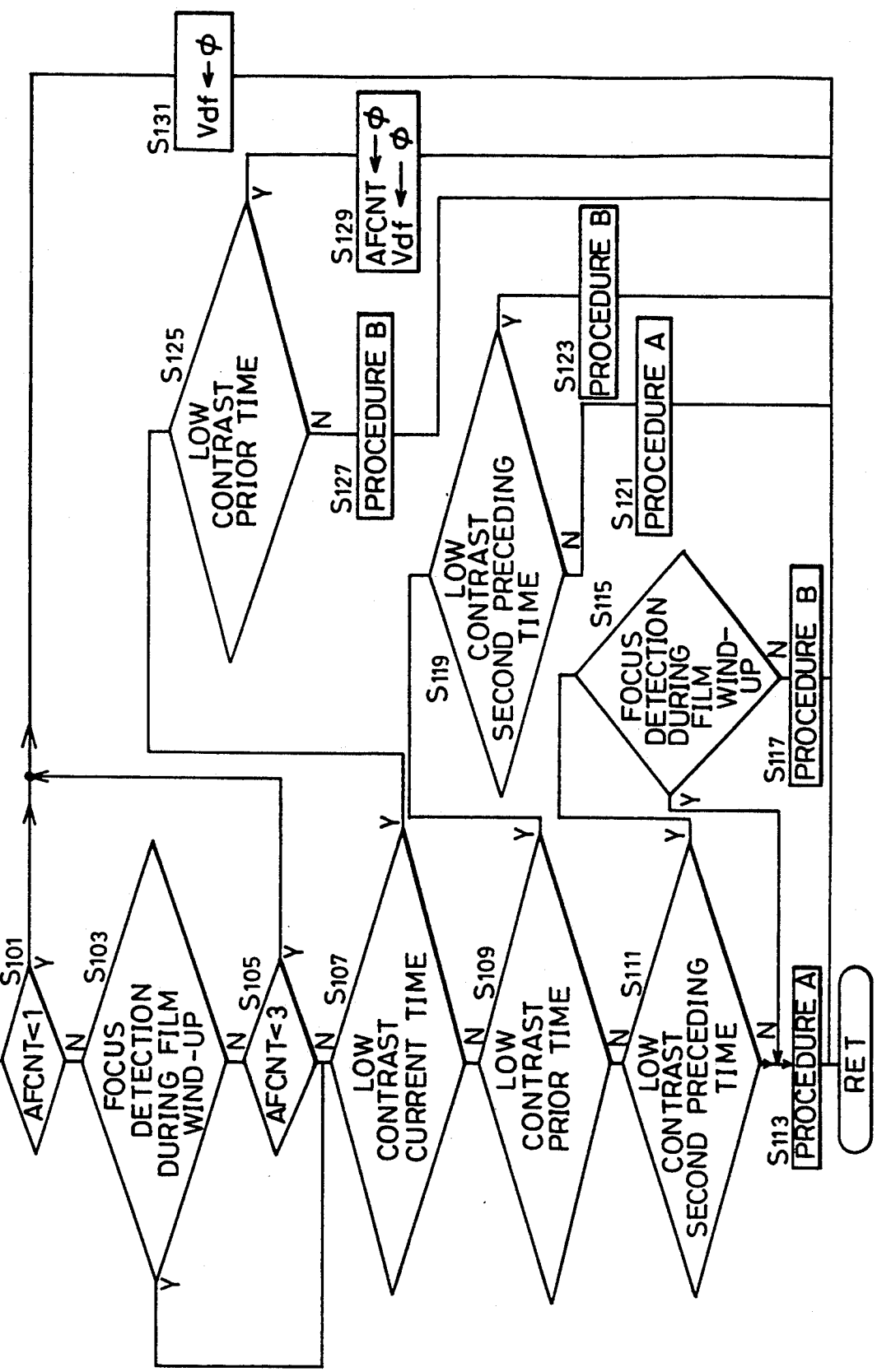
FIG. 7 is a flow chart showing defocus velocity calculation.

The defocus velocity calculation indicated at S65 of FIG. 5 will be described more specifically with reference to FIG. 7.

In the calculation of defocus velocity, determination is made whether a focus detection number counter AFCNT is less than 1 or not (S101). If focus detection has been carried out at least once, determination is made whether the focus detection was carried out during film wind-up at S103. If N at S103, the program proceeds to S105 where determination is made whether focus detection number counter AFCNT is less than 3. If focus detection number counter AFCNT is not less than 3 and determination is made at S103 that focus detection was carried out during film wind-up, the program proceeds to S107 where determination is made whether the current object is of low contrast or not. If N at S107 and determination is made that the object is not of low contrast at the prior and second-prior time (N at S109 and S111), a procedure A which will be described afterwards is carried out (S113). When determination is made that the object is not of low contrast at this time and the prior time in S107, S109 and determination is made of a low contrast only at the second-prior time (Y at S111), the program proceeds to S115 where determination is made whether focus detection was carried out during film wind-up. If Y at S115, procedure A is carried out. If N at S115, a procedure B is carried out (S117). If low contrast is not detected at the current time in S107 and low contrast is detected at the prior time (Y at S109), the program proceeds to S119 where determination is made whether low contrast is detected at the second-prior time. If N at S119, procedure A is carried out (S121). If determination is made that low contrast is detected at the second-prior time (Y at S119), procedure B is carried out (S123).

If determination is made that the current object is of low contrast (Y at S107), the program proceeds to S125 where determination is made whether low contrast was detected at the prior time. If Y at S125, focus detection number counter AFCNT and defocus velocity Vdf are both set to 0 (S129). If N at S125, procedure B is carried out (S127). If focus detection is not carried out at all, or if focus detection is carried out less than 3 times and not carried out during film wind-up (Y at S101 or S105), defocus velocity Vdf is set to 0 (S131) and the program returns to the main flow chart.

Figure 8:
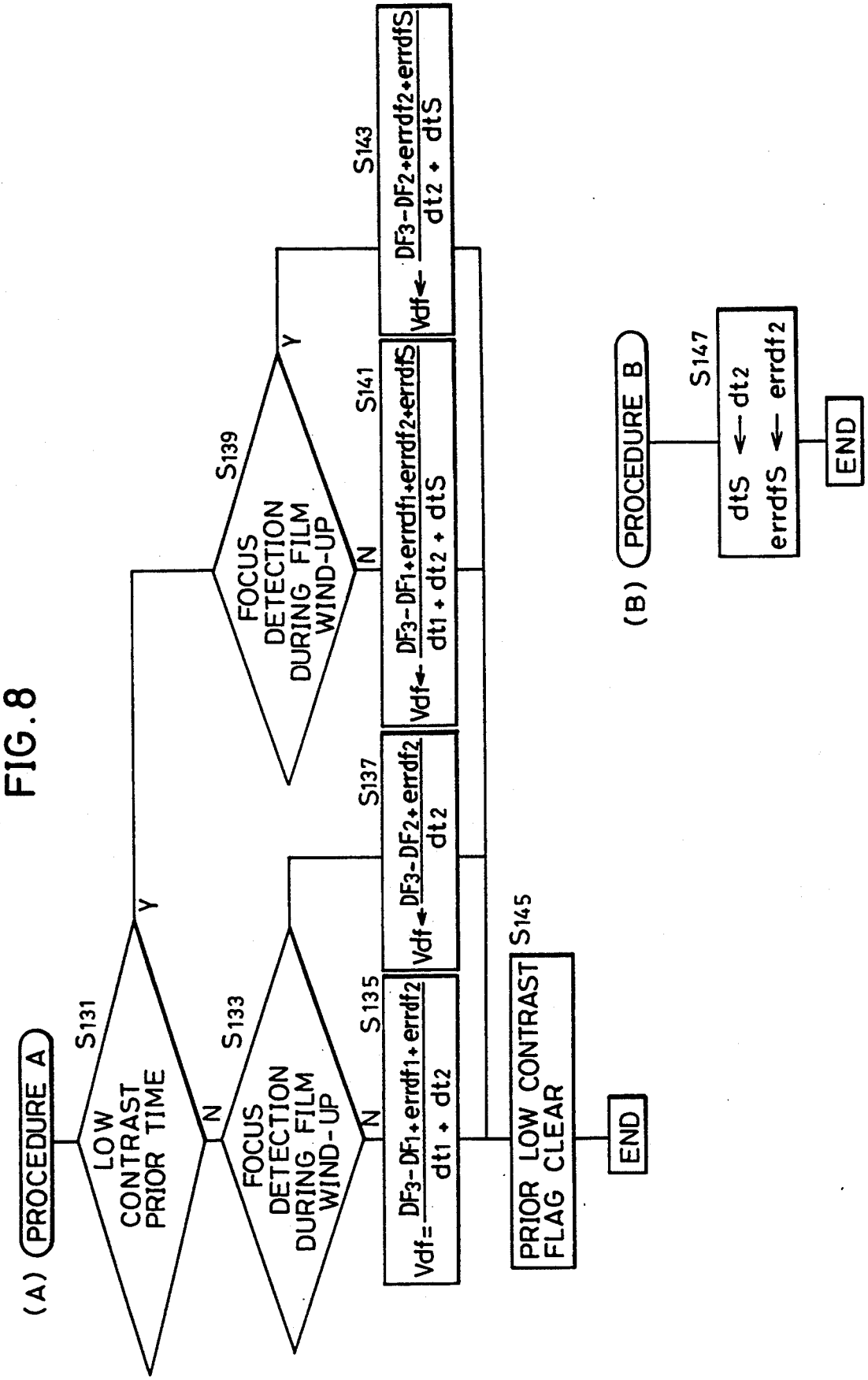
FIG. 8 is a flow chart for describing the contents of procedures A and B used in defocus velocity calculation.

The details of procedures A and B will be described with reference to FIG. 8. (A) is a flow chart showing the process of procedure A, and (B) is a flow chart indicating the process of procedure B.

Referring to (A), determination is made whether low contrast was detected at the prior time at S131. If N at S131, the program proceeds to S133 where determination is made whether the focus detection was carried out during film wind-up. If N at S133, defocus velocity Vdf is expressed as in the following equation:

$$Vdf = (DF3 - DFf1 + errdf1 + errdf2) / (dt1 + dt2)$$

If determination is made that the focus detection was carried out during film wind-up at S133 (Y), the defocus velocity is obtained as follows (S137):

$$Vdf = (DF3 - DF2 + errdf2) / dt2$$

If determination is made that low contrast was detected at the prior time in S131 and that focus detection was not carried out during film wind-up (N at S139), defocus velocity Vdf is obtained by the following equation (S141):

$$Vdf = (DF3 - DF1 + errdf1 + errdf2 + errdfs)/(dt1 + dt2 + dtS)$$

If determination is made that focus detection was carried out during film wind-up (Y at S139), defocus velocity Vdf is expressed as follows (S143):

$$Vdf = (DF3 - DF2 + errdf2 + errdfs) / (dt2 + dtS)$$

When a defocus velocity is obtained, the prior low contrast flag is cleared (S145).

In the equations, dt1 indicates the prior focus detection interval, dt2 the current focus detection interval, and dts the stored focus detection interval. DF1 indicates the second-prior defocus amount, DF2 the prior defocus amount, and DF3 the current defocus amount. Furthermore, errdf1 is a defocus amount due to the prior drive of the lens, errdf2 is a defocus amount due to the current drive of the lens, and errdfs is a stored defocus amount. The details of these values will be described afterwards.

Procedure B is described hereinafter. In procedure B, dt2 is substituted for dts, and errdf2 is substituted for errdfs (S147). Then, the program returns to the main program.

Figure 9:
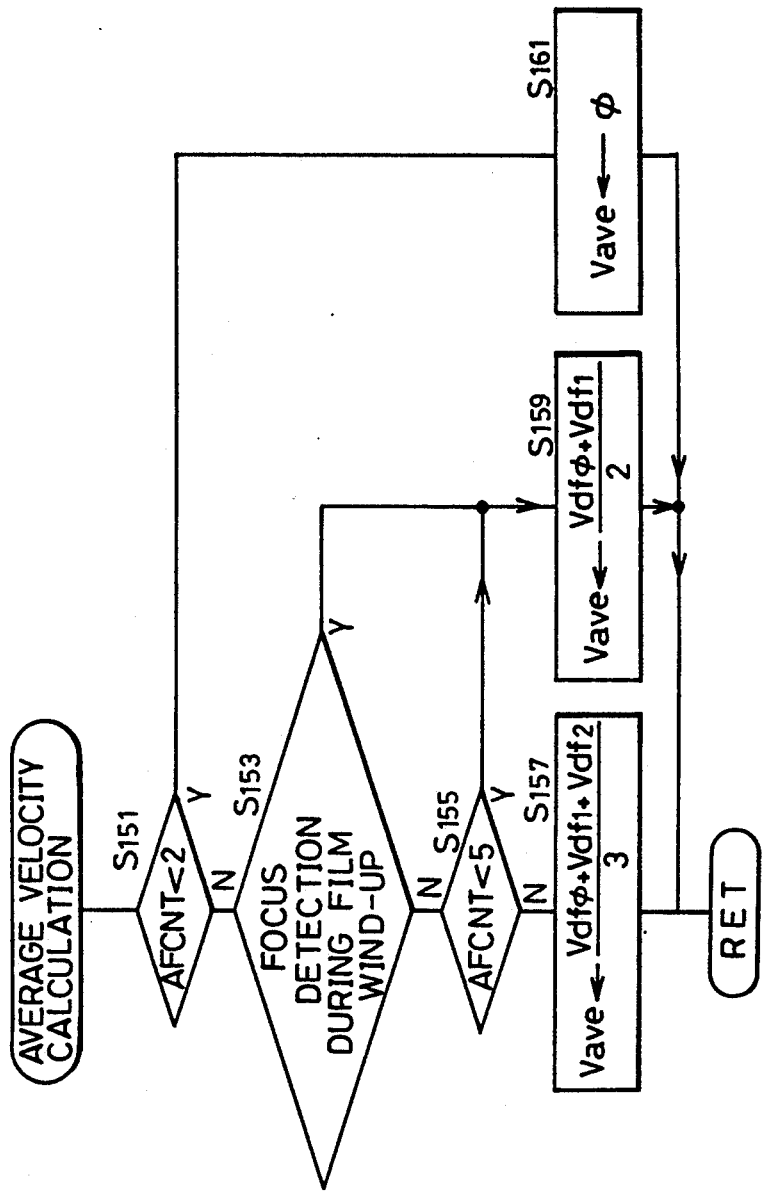
FIG. 9 is a flow chart showing average velocity calculation.

The average velocity calculation in S67 of FIG. 5 will be described with reference to FIG. 9. FIG. 9 is a flow chart showing the subroutine of average velocity calculation.

The equations of average velocity calculation are expressed as follows according to the value of focus detection number counter AFCNT and whether focus detection was carried out during film wind-up or not.

If focus detection number counter AFCNT is at least 5 and focus detection was not carried out during film wind-up (N at S151-S155), average velocity Vave is expressed as follows (S157):

$$Vave = (Vdf0 + Vdf1 + Vdf2) / 3$$

If focus detection number counter/AFCNT is at least 2 and less than 5, and when focus detection was carried out during film wind-up (Y in S153 and S155), average velocity Vave is expressed as follows (S159):

$$Vave = (Vdf0 + Vdf1) / 2$$

If focus detection number counter AFCNT is less than 2 (Y at S151), average velocity Vave is expressed as 0 (S161).

Figure 10:
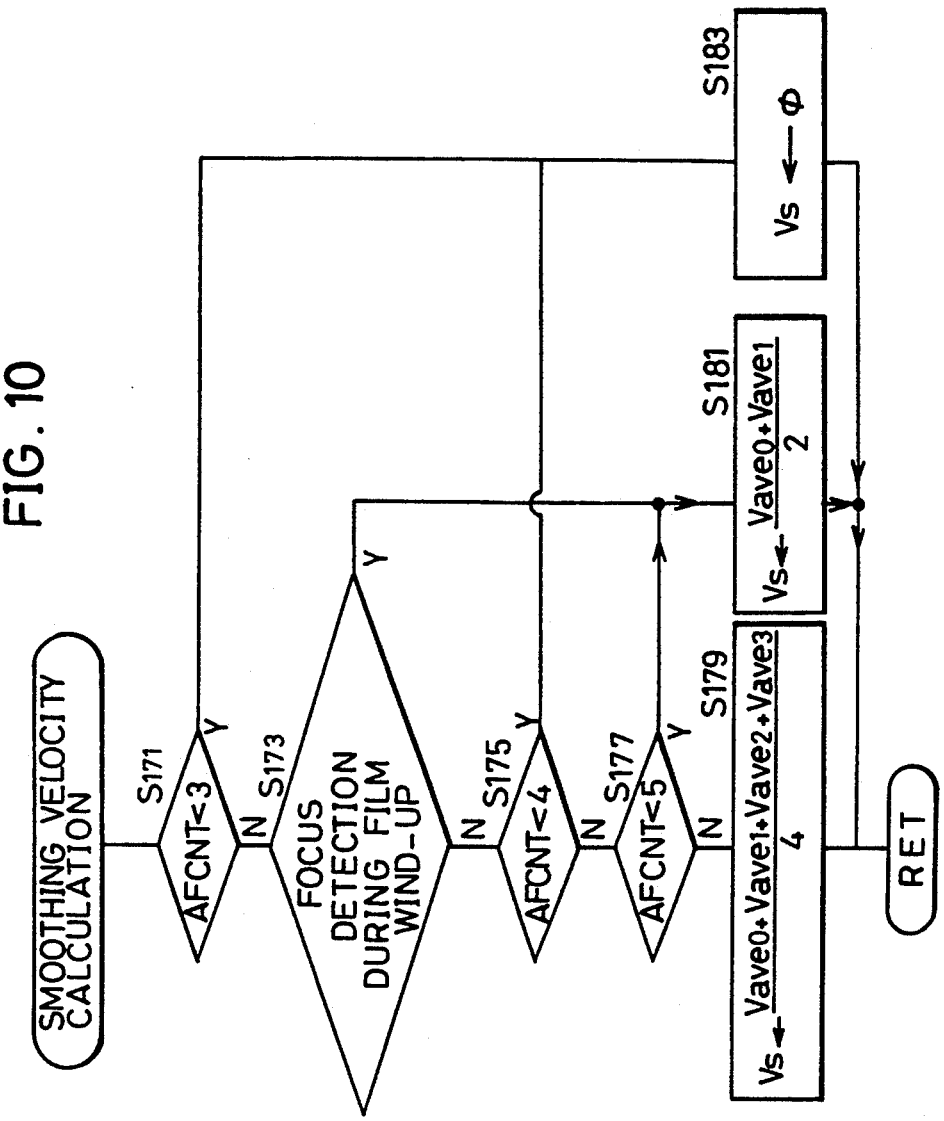
FIG. 10 is a flow chart showing the contents of smoothing velocity calculation.

FIG. 10 is a flow chart indicating the subroutine of smoothing velocity calculation in S619 of FIG. 5. The subroutine of smoothing velocity calculation will be described hereinafter with reference to FIG. 10.

Smoothing velocity Vs is expressed by the following equations according to the value of focus detection number counter AFCNT and whether focus detection was carried out during film wind-up or not.

If focus detection number counter AFCNT is at least 5 and focus detection was not carried out during film wind-up (N at S171–S177), smoothing velocity Vs is expressed as follows (S179):

$$Vs = (Vave0 + Vave1 + Vave2 + Vave3) / 4$$

If focus detection was carried out during film wind-up or if the value of focus detection number counter AFCNT is at least 3 and less than 5 (Y at S173 and S177), smoothing velocity Vs is expressed as follows (S181):

$$Vs = (Vave0 + Vave1 +) / 2$$

If focus detection number counter AFCNT is less than 3, or if focus detection was not carried out during film wind-up and focus detection number counter AFCNT is less than 4 (Y at S171 or S175), smoothing velocity Vs=0 (S183).

Figure 11:
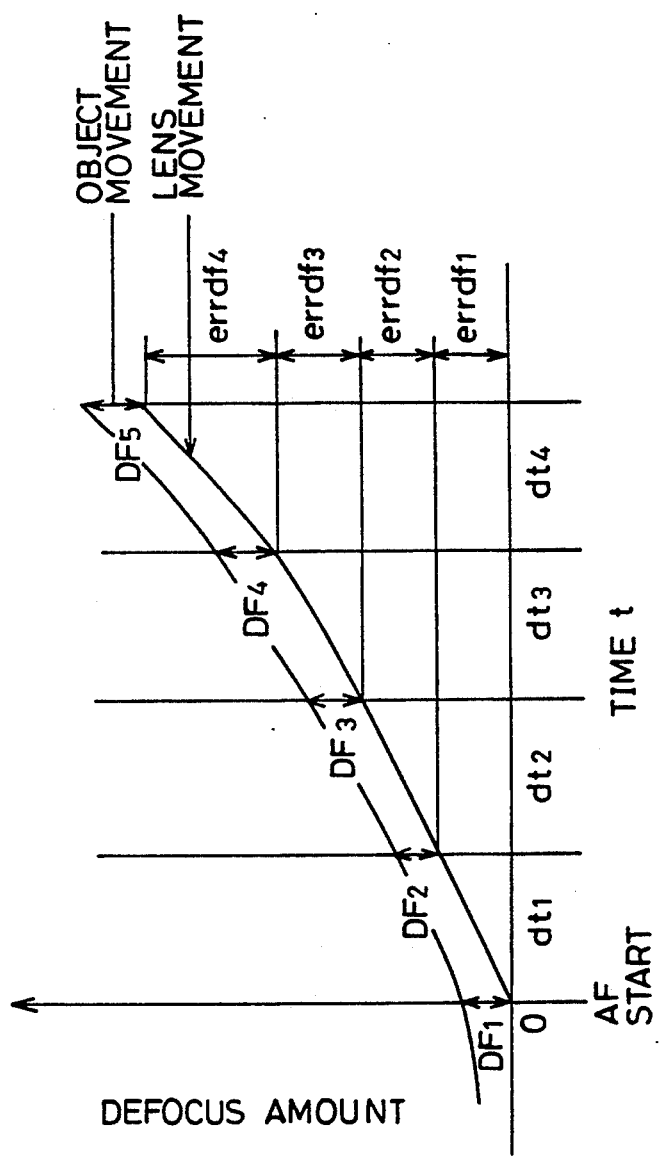
FIG. 11 shows the relationship between defocus amount and time.

The relationship of the aforementioned defocus amount DF, focus detection interval dt, defocus amount due to the drive of the lens between focus detection intervals errdf, defocus velocity Vdf, and average velocity Vave will be described with reference to FIG. 11. FIG. 11 indicates the movement of an object during each time period and the movement of the lens following thereof, with X axis representing time and Y axis representing the amount of defocus. Assuming that AF operation is initiated at point 0, defocus amount DF1 is as indicated in FIG. 11. Focus detection is carried out at a predetermined focus detection interval of dt1. More specifically, integration is carried out by a CCD not shown, whereby the lens is driven to a position calculated according to the integration. In practice, defocus amount errdf1 is incurred accompanying the drive of the lens during the intervals because the lens itself moves during the integration and calculation. The lens is made to follow the movement of the object as described above.

Figure 12:
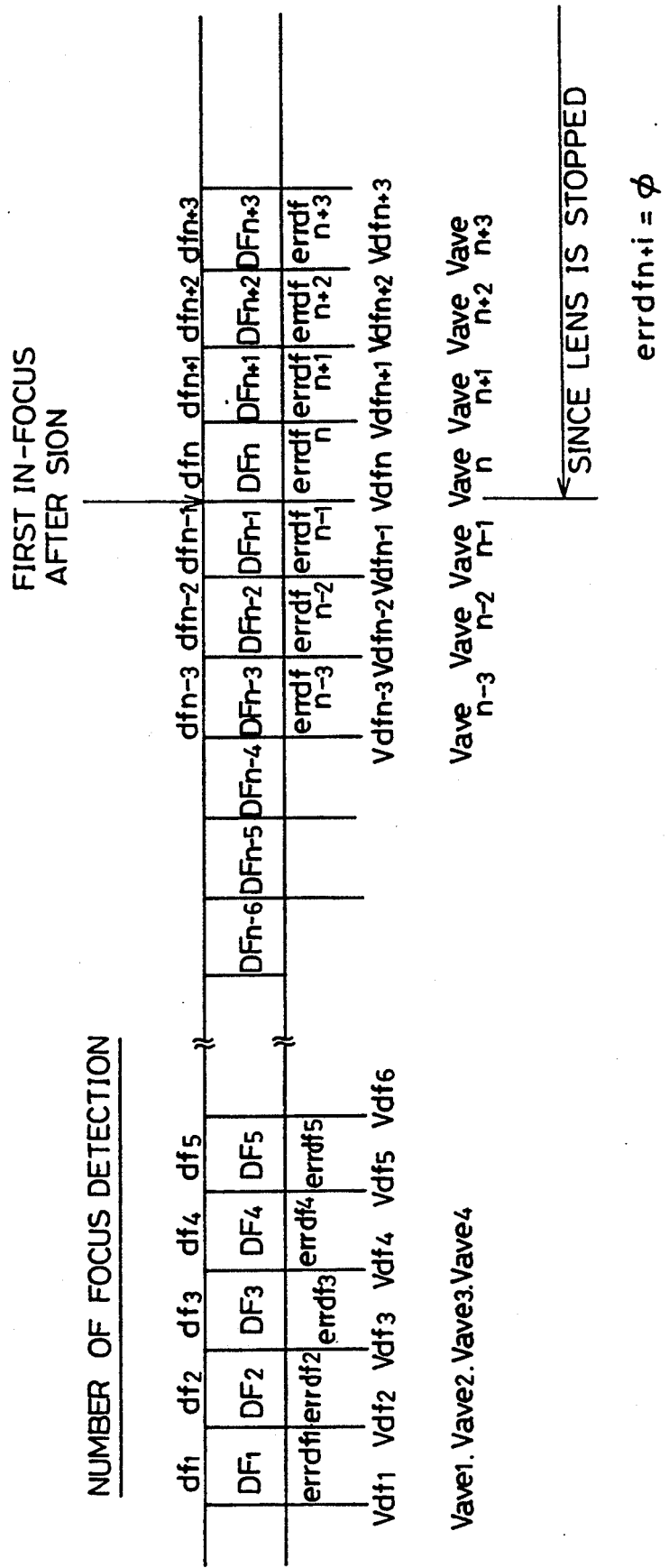
FIG. 12 shows the relationships of focus detection interval dt, defocus amount df, defocus velocity Vdf, and average velocity Vave.
Figure 13:
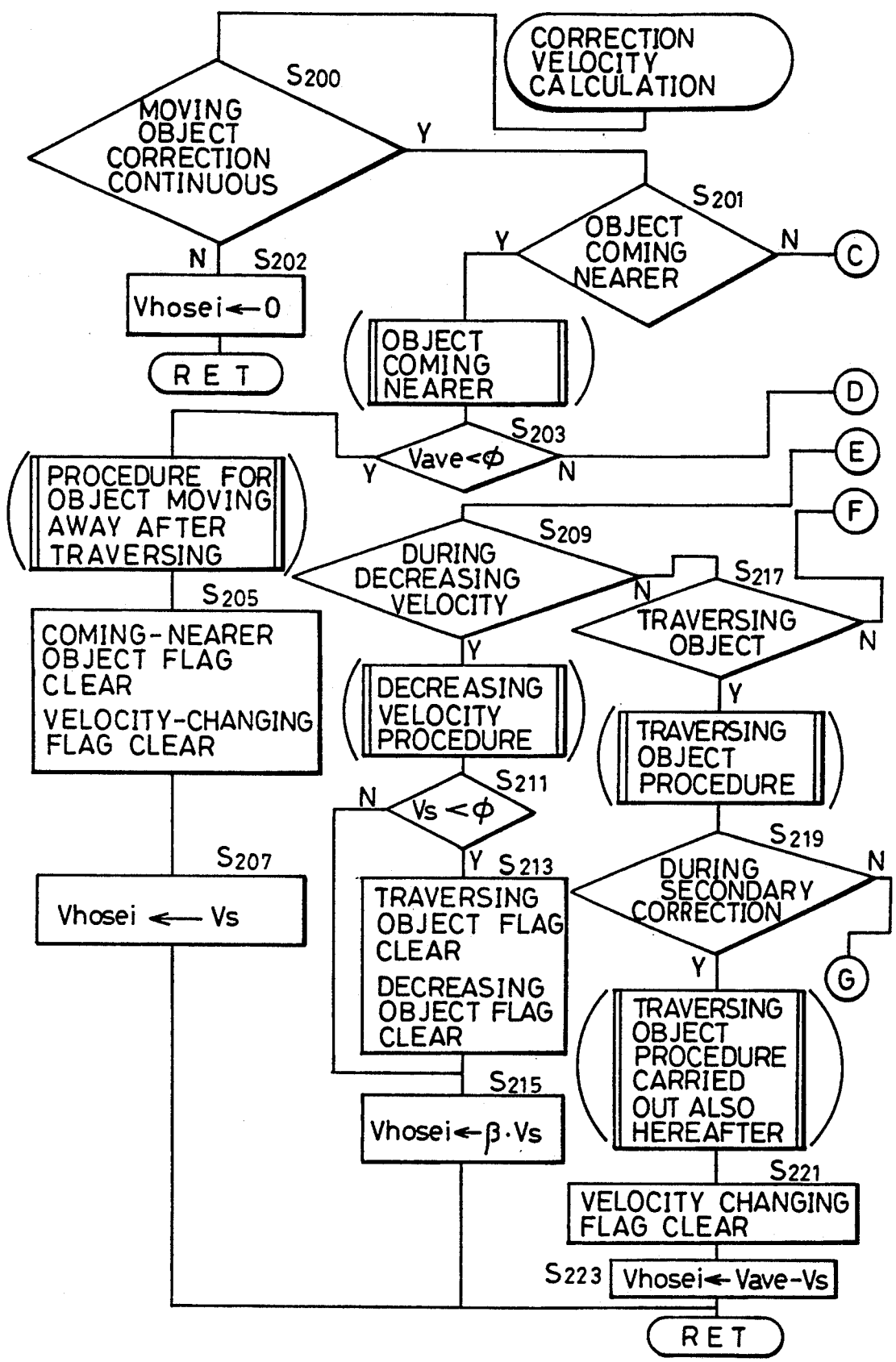
FIGS. 13-19 are flow charts showing the contents of correction velocity calculation.
Figure 14:
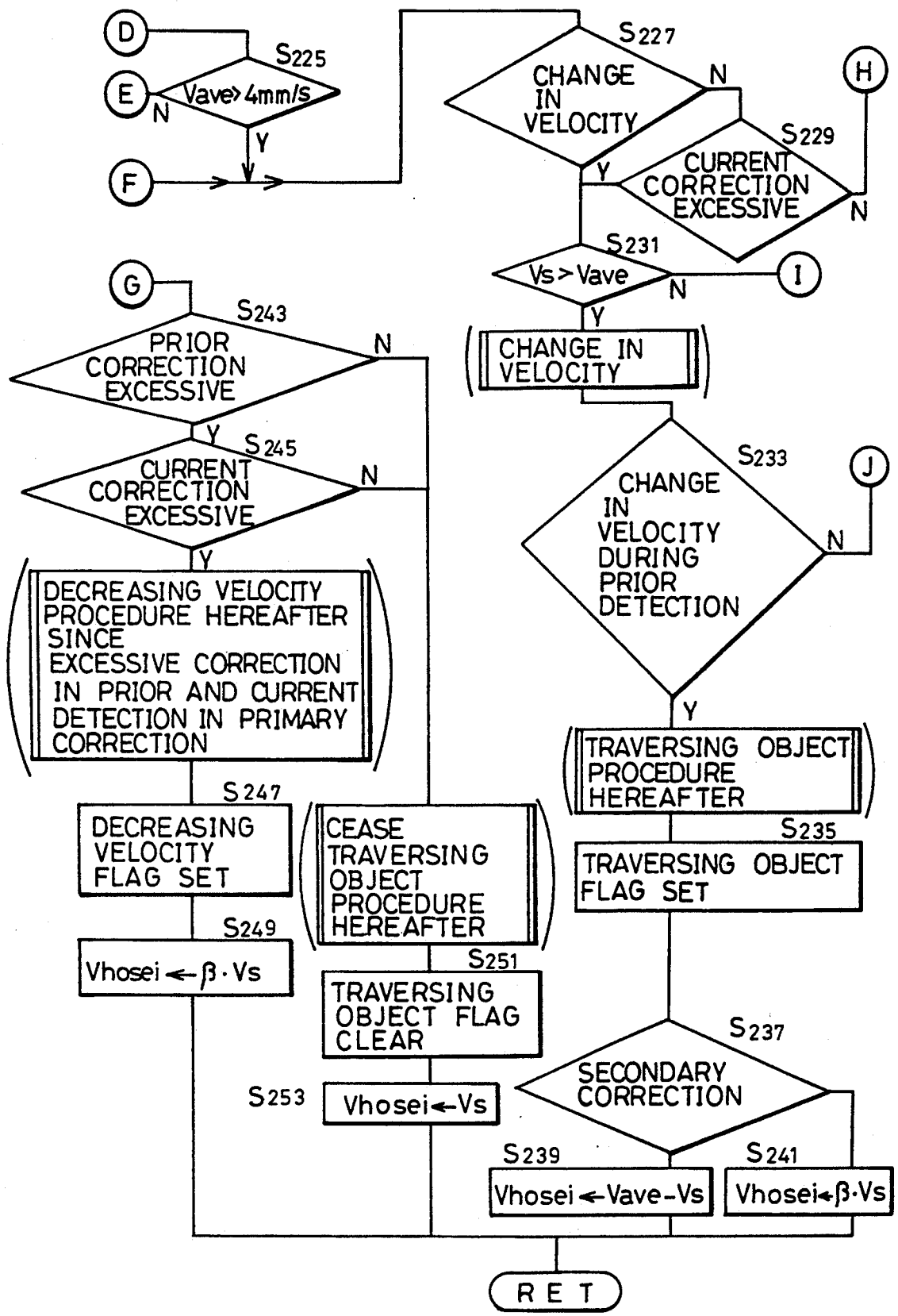
Figure 15:
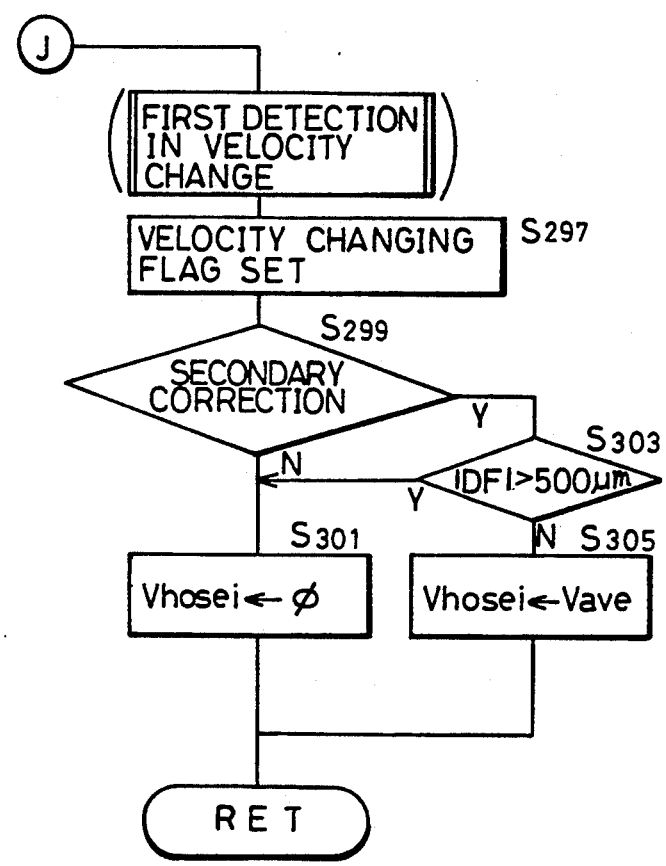
Figure 16:
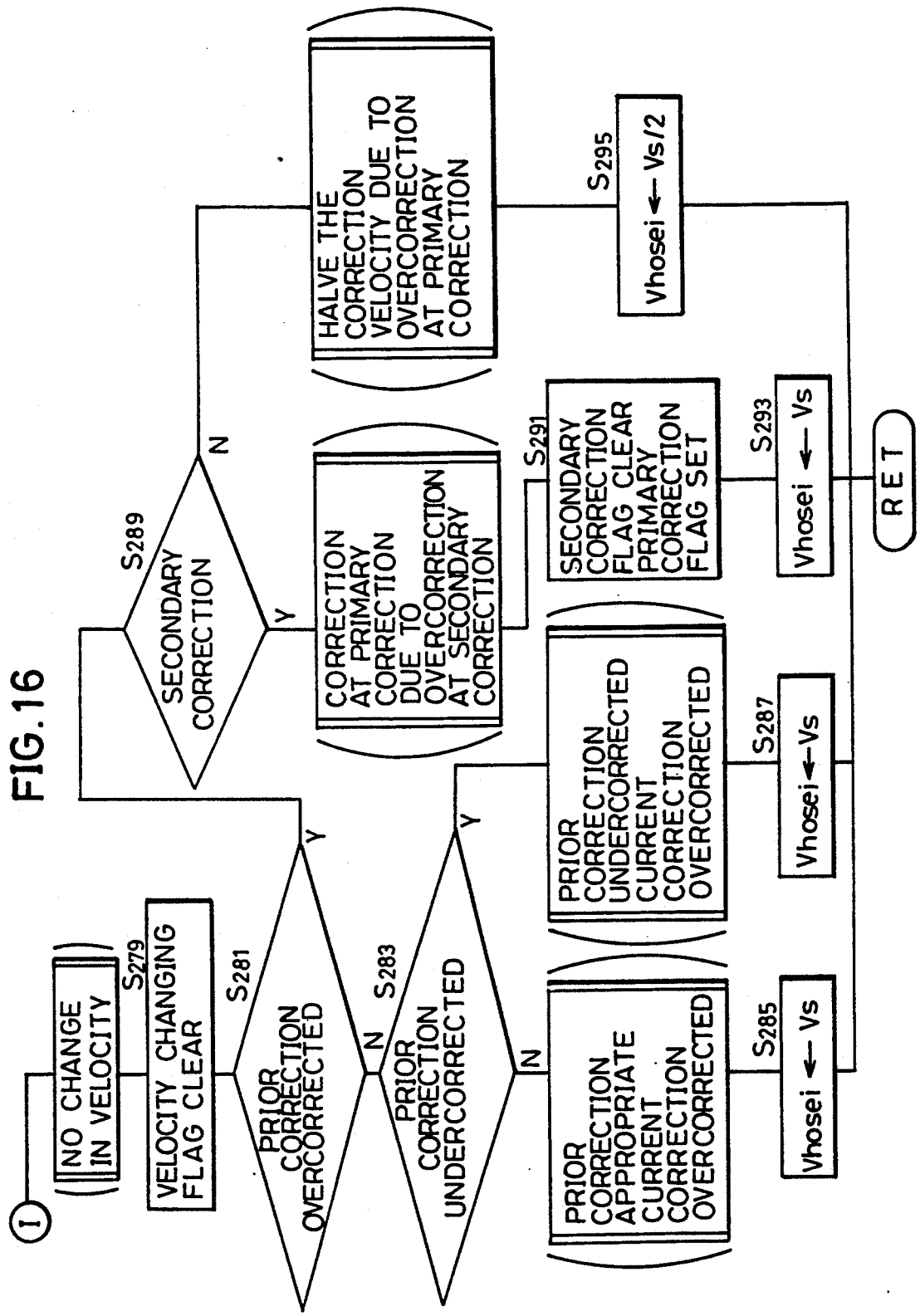
Figure 17:
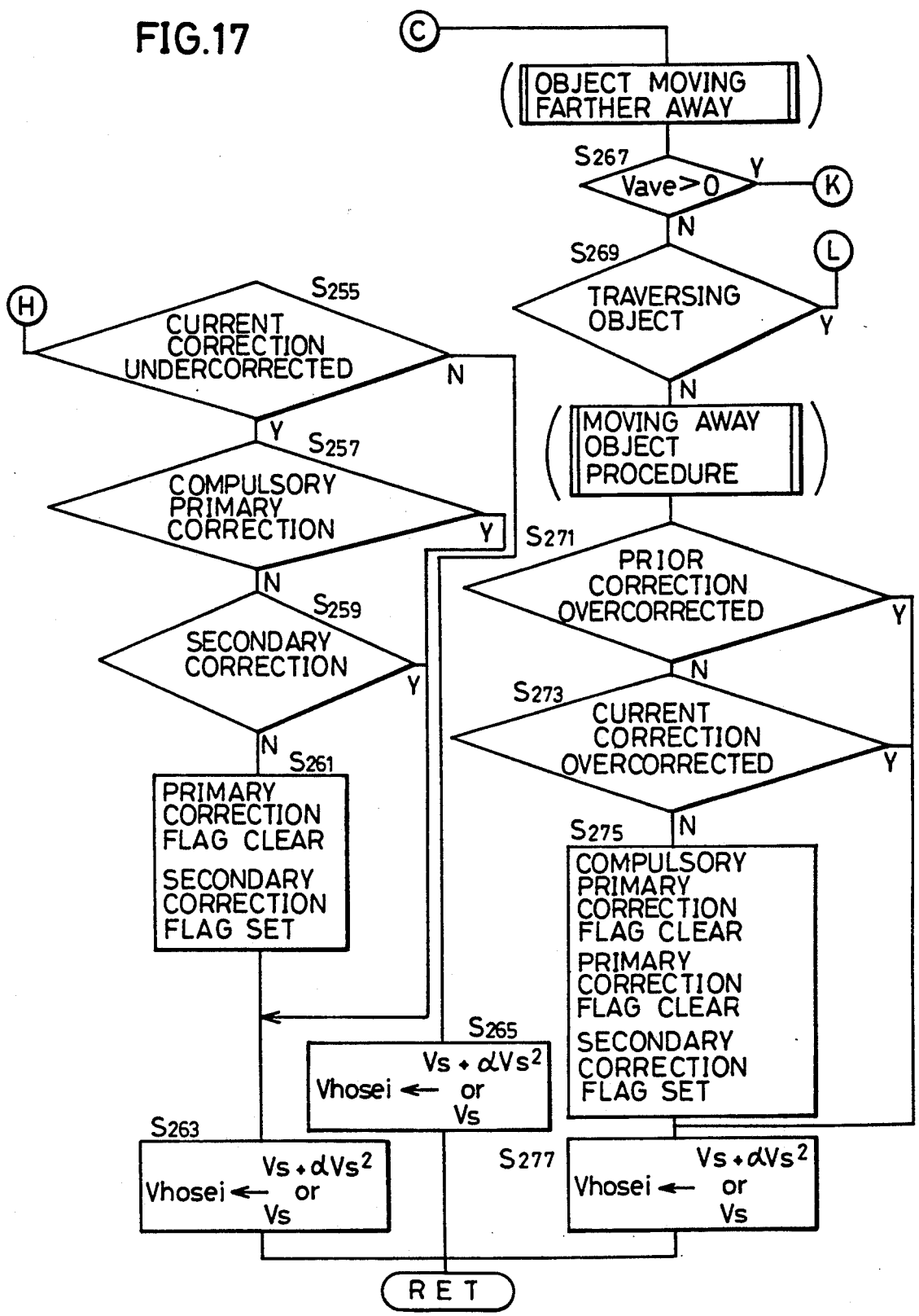
Figure 18:
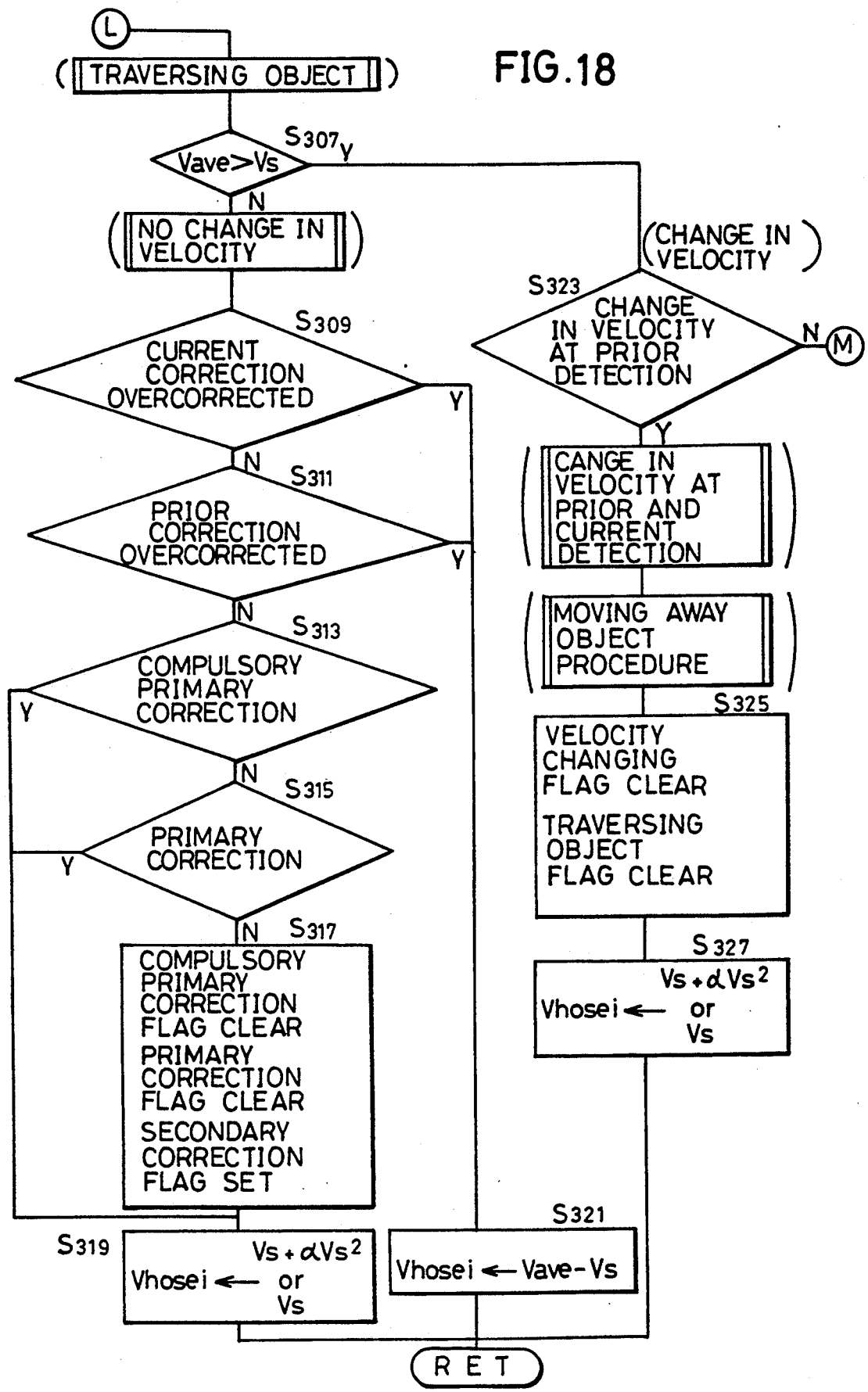
Figure 19:
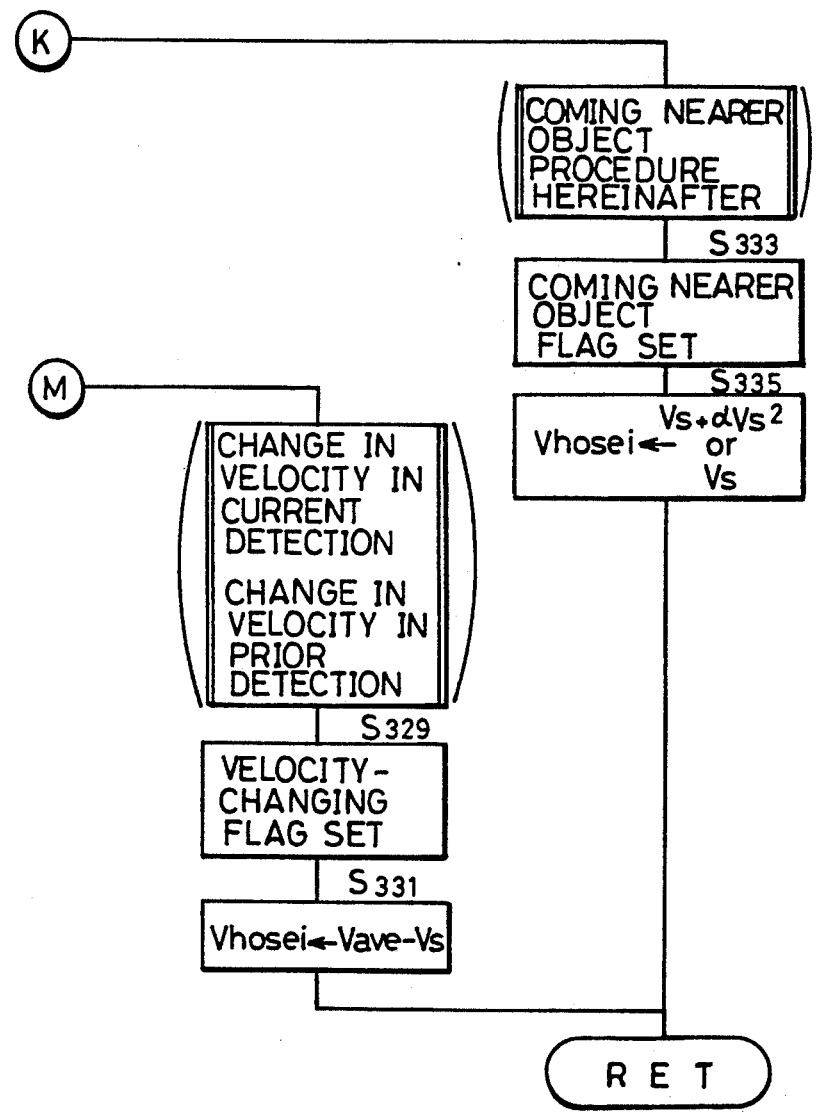

FIG. 12 shows the relationship of defocus velocity Vdf and average velocity Vave with respect to focus detection interval dt, defocus amount DF, and defocus amount between focus detection intervals errdf according to the contents of FIG. 11. Referring to FIG. 12, the defocus amount corresponding to focus detection intervals dt1, dt2, . . . is DF1, DF2, . . . , and the defocus amount on account of the drive of the lens during each interval is errdf1, errdf2, . . . . The defocus velocity of Vdf1, Vdf2, . . . correspond to focus detection interval dt1, dt2, . . . , respectively, and average velocity Vave 1, Vave 2, . . . correspond to focus detection intervals dt1, dt2, . . . , respectively.

The calculation of correction velocity in S71 of FIG. 5 will be described with reference to the flow charts of FIGS. 13–19. In the drawings, the legend enclosed in parenthesis summarizes the succeeding process.

At S200, determination is made whether the mode is the moving object correction continuous mode or not. If N at S200, 0 is substituted in Vhosei at step S202. If determination is made that the mode is moving object correction continuance at S200, the program proceeds to S201 where determination is made whether the object is an approaching object or not.

If the object is coming closer (Y at S201), the program proceeds to S203 where determination is made whether average velocity Vave is smaller than 0. If determination is made that average velocity Vave is a negative value (Y at S203), a process for an object moving farther away will be carried out since it is the case where an object traverses in front of the camera. More specifically, a flag indicating an object coming nearer is cleared, and a flag indicating change in velocity is cleared. Then, smoothing velocity Vs is substituted into correction velocity Vhosei (S205, S207).

If average velocity Vave is a positive value (N at S203), the program proceeds to S255 where determination is made whether average velocity Vave is greater than 4 mm/s. If N at S225, the program proceeds to S209 where determination is made whether the object is slowing down. If Y at S209, a process for an object slowing down is carried out. More specifically, determination is made whether smoothing velocity Vs is smaller than 0. If Y at S211, a traversing-object flag for carrying out the process for an object moving farther away is cleared, and then a decreasing-velocity flag is cleared. If smoothing velocity Vs is a positive value, the above-mentioned flags will not be cleared and $\beta$.Vs is employed as correction velocity Vhosei (S211–S215). $\beta$ is a constant number, and $\beta < 1$. $\beta$ differs from the photographing magnification. $\beta$.Vs is established for the purpose of avoiding excessive correction during decrease in velocity. If determination is made that the object is not slowing down at S209 ($\beta$ is a constant number), the program proceeds to S217 where determination is made whether the object is traversing in front of the camera. If Y at S217, a process for a traversing object is carried out.

More specifically, if during secondary correction (Y at S219), the process for a traversing object will be carried out thereafter. Therefore, the velocity-changing flag is cleared, and Vave - Vs is substituted in correction velocity Vhosei (S211, S223). This is because correction for in-focus is little, although the change in velocity is great.

When determination is made that the object is not during secondary correction (N at S219), the program proceeds to S243 and then to S245 where determination is made whether the prior correction and the current correction are over-corrected or not. Y in both steps of S243 and S245 indicates that the prior correction and the current correction of the primary correction are both over-corrected. Therefore, a decreasing-velocity flag is set and $\beta$.Vs is substituted in correction velocity Vhosei for carrying out a decreasing velocity process (S247, S249). If determination is made that the correction is not excessive in either the prior correction or the current correction (N at S243 or S245), the traversing-object flag is cleared, and Vs is substituted in correction velocity Vhosei in order to suppress a traversing-object process thereafter (S251, S253).

If determination is made that the object is not traversing (N at S217) and determination is made that average velocity Vave is greater than 4 mm/s (N at S225), the program proceeds to S227 where determination is made whether there is a change in velocity or not. If Y at S227, the program proceeds to S231 where smoothing velocity Vs is compared to average velocity Vave. If smoothing velocity Vs is greater than average velocity Vave (Y at S231), determination is made that there is a change in the velocity. At S233, determination is made whether there was a velocity change in the prior detection or not. If determination is made that there is a change in velocity in the prior and current detection (Y in both S231 and S233), a traversing-object process will be carried out thereafter. More specifically, the traversing-object flag is set, and Vave-Vs or $\beta$.Vs is substituted in correction velocity Vhosei depending on the presence/absence of a secondary correction (S235-S241).

If determination is made that there is no change in velocity during the prior detection at S233 (N at S233), a velocity-changing flag is set indicating an initial change in velocity. Then 0 or Vave is substituted in correction velocity Vhosei according to the presence/absence of a secondary correction and whether the absolute value of defocus amount DF is greater or not than 500 $\mu$m (S297-S305).

If average velocity Vave is greater than smoothing velocity Vs at S231, determination is made that there is no change in velocity and the velocity-changing flag is cleared (S279). Then, the program proceeds to S281 where determination is made whether the prior correction was over-corrected or not. If N at S281, the program proceeds to S283 where determination is made whether the prior correction was under-corrected or not. If N at S283, Vs is substituted in correction velocity Vhosei since the prior correction is adequate and the current correction is excessive (S285). When the prior correction is under-corrected and the current correction is excessive (N at S281 and Y at S283), Vs is substituted in correction velocity Vhosei (S287).

If determination is made that the prior correction is excessive (Y at S281), the following processes are carried out according to the absence/presence of secondary correction. If secondary correction is carried out (Y at S289, a secondary correction flag is cleared for carrying out correction at primary correction since the secondary correction is excessive. Then, the primary correction flag is set and Vs is substituted in correction velocity Vhosei (S291, S293). If secondary correction is not carried out (N at S289), Vs/2 is substituted in correction velocity Vhosei to halve the correction velocity since the primary correction is excessive (S295).

When determination is made that the current correction is excessive (N at S229), the program proceeds to S255 where determination is made whether the current correction is under-corrected or not. If Y at S255, a primary correction flag is cleared and a secondary correction flag is set according to the absence/presence of compulsory primary correction and secondary correction, and Vs+$\alpha$.Vs$^2$ or Vs is substituted in correction velocity Vhosei (S257-S263). When determination is made that the current correction is not under-corrected (N at S255), Vs +$\alpha$.Vs$^2$ or Vs is directly substituted in correction velocity Vhosei (S265).

The process of an object moving farther away will be described hereinafter (N at S201). The program proceeds to S267 where determination is made whether average velocity Vave is a positive value or not. If determination is made that the value is negative, the program proceeds to S269 where determination is made whether the object is a traversing-object or not. If N at both S267 and S269, the process of an object moving farther away is carried out. More specifically, a compulsory primary correction flag is cleared, a primary correction flag is cleared, and then a secondary correction flag is set according to whether the correction was excessive in the prior correction and in the current correction. Then, Vs+$\alpha$.Vs$^2$ or Vs is substituted in correction velocity Vhosei (S271-S277).

When determination is made that the moving object is a traversing object (Y at S269), the program proceeds to S307 where average velocity Vave is compared with smoothing velocity Vs. If average velocity Vave is smaller (N at S307), determination is made that there is no change in velocity and the program proceeds to S309. in S309 and S311, determination is made whether the current correction and the prior correction was excessive or not. If either correction was excessive, Vave - Vs is substituted in correction velocity Vhosei (S321). On the other hand, if not, determination is made whether the compulsory primary correction and the primary correction is carrying out or not (S313 and S315). If either correction is not carrying out, the compulsory primary correction flag and the primary correction flag are cleared and the secondary correction flag is set (S319). After S319 or if it is determined that eother correction is carrying out in S313 or S315, Vs+$\alpha$.Vs$^2$ or Vs is substituted in correction velocity Vhosei (S319).

An average velocity Vave greater than smoothing velocity Vs (Y at S307) indicates that there is a change in velocity. The program proceeds to S323 where determination is made whether there is a change in velocity in the prior detection or not. If Y at S323, determination is made that there is change in velocity in the prior detection. Therefore, a process for an object moving farther away is carried out thereafter. More specifically, the velocity-changing flag and the traversing-object flag are cleared, and Vs+$\alpha$.Vs$^2$ or Vs is substituted in Vhosei (S325, S327).

If determination is made that there is no change in velocity in the prior detection (N at S323), the program proceeds to S329 where a velocity-changing flag is set, and Vave - Vs is substituted in correction velocity Vhosei (S329, S331).

If determination is made that average velocity Vave is a positive value (Y at S267), a process for an object coming closer is carried out thereafter. More specifically, a coming-nearer object flag is set, and Vs+$\alpha$.Vs$^2$ or Vs is substituted in correction velocity Vhosei (S333, S335).

In the above description, a secondary correction is a correction where Vs+$\alpha$.Vs$^2$ is used as correction velocity Vhosei.

Figure 20A:
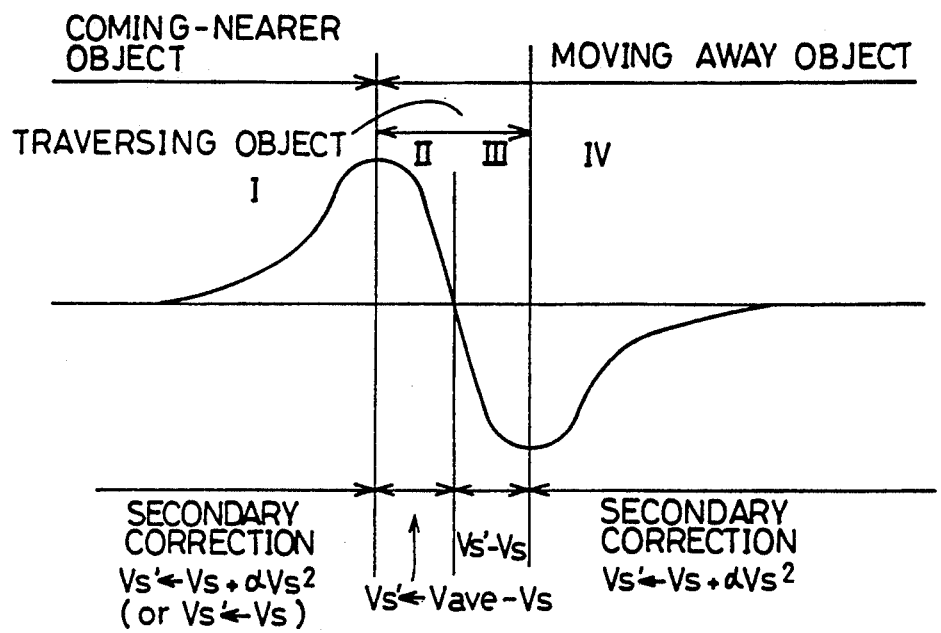
FIGS. 20(A) and 20(B) show the calculations of correction velocity for each zone of an object traversing in front of a camera.
Figure 20B:
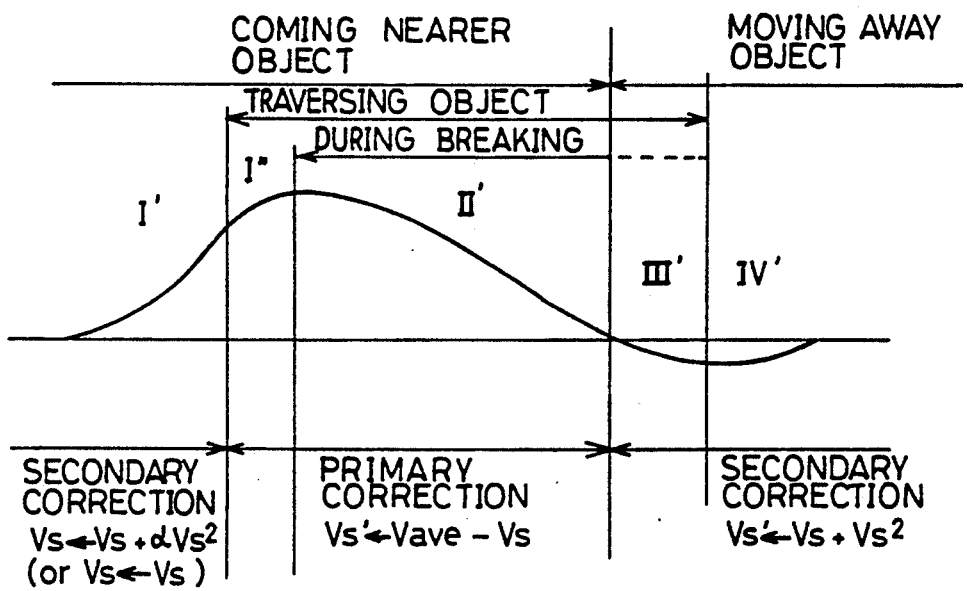

The above correction velocity will be described hereinafter with reference to FIG. 20 in relation to the actual movement of an object. FIG. 20 shows the relationship between the velocity and elapse of time of an object traversing in front of the camera. (A) shows the case where an object traverses in front of the camera at a constant speed. (B) shows the case where an object traverses in front of a camera while slowing down. Referring to (A), the areas where an object comes nearer and where an object moves away with acceleration in the opposite direction are divided into I-IV with the boundaries at the respective points of the extreme value and at the point where the velocity is 0. The velocity is corrected using the corresponding correction equation at the bottom column in the drawing. The same can be said for (B).

Referring to FIG. 21, the definition of the transition points of the moving object correction zones I-IV of FIG. 20 will be described hereinafter. Defocus velocity Vdf is obtained by defocus amount DF and focus detection interval dt. The defocus velocity is averaged to obtain average velocity Vave. The average velocity is further averaged to obtain smoothing velocity Vs. A graphic representation of each of the velocity is shown in FIG. 21. The solid line represents defocus velocity Vdf, the broken line represents average velocity Vave, and the chain dotted line represents smoothing velocity Vs.

Although the approach of differentiating the defocus velocity, the average velocity, or the smoothing velocity to obtain a limit value is ideal, this method will take too much amount of calculation. Another consideration is to obtain the peak of the velocity by comparing the values of the "n"th defocus velocity (average velocity, smoothing velocity) with the "n-1"th or "n-m"th defocus velocity. However, this method will be greatly affected by calculation errors. In the present invention, the transition points of the zones are defined by the following method.

Since average velocity Vave is obtained by averaging defocus velocity Vdf and smoothing velocity Vs is obtained by averaging average velocity Vave, the increase or decrease in velocity of defocus velocity Vdf occurs first, and then those of smoothing velocity Vs and average velocity Vave follow subsequently. Therefore, the respective manners of change in velocity includes time delay as shown in FIG. 21.

The transition points of the zones are defined taking advantage of this time delay. More specifically, utilizing the average velocity Vave and smoothing velocity Vs which have low calculation error and fluctuation, the zone transition point is defined to be where the magnitude of these two values is reversed (I to II, III to IV). The transition point of zone II to zone III is where the sign of average velocity Vave changes (from + to −, from − to +).

The moving object detection conditions will be described hereinafter with reference to FIGS. 23 and 24.

The conditions where the AF is in the eye piece continuous mode will be first described. If the average velocity Vave is at least 1 mm/s and smaller than −3 mm/s, the mode changes to normal continuous AF (multi-moving object prediction AF). When switch S1 becomes ON in eye-piece continuous mode, the latest average velocities, i.e. Vave, Vave-1, Vave-2, Vave-3, and Vave-4 all within the range of −1 mm/s to 1 mm/s causes a transition to the one shot AF mode, otherwise to the normal continuous. The transition after changing to a normal continuous mode will be described afterwards.

When in one shot AF mode, a photographing magnification $\beta$ greater than 1/25 or an accumulation time greater than 40 ms causes the change to the normal continuous mode to be inhibited. When in-focus is not obtained after a continuous drive of the lens of more than 4 times, or when the lens can not be stopped even when focus detection is carried out more than 8 times at one lens driving operation, a transition to the normal continuous mode is achieved.

When in-focus is obtained at the in-focus detection operation when the lens is not moving, the mode changes to stationary detection AF. Otherwise, the one shot AF mode is maintained.

The case where the mode is in stationary detection AF mode will be described. When photographing magnification $\beta$ is greater than 1/25 or when the accumulation time is greater than 40 ms, the change to the normal continuous mode is inhibited. When the average value of the latest two defocus amount is a value more than 400 $\mu$m from the base defocus (referred to as base DF hereinafter) which is an average value of two defocus amounts, or when the five latest average velocities, i.e. Vave, Vave-1, Vave-2, Vave-3, Vave-4 all are smaller than −3 mm/s or greater than 1 mm/s right after the transition to a stationary detection mode, the mode changes to a normal continuous mode. When the average value of the two latest defocus amounts are within 300 $\mu$m from base DF, or when focus detection is completed for a predetermined number of times, the mode changes to the AF lock mode.

The case where the mode is normal continuous AF will be described hereinafter. When the defocus pulse conversion coefficient K is greater than 1.0, when photographing magnification $\beta$ is greater than 1/25, or when the accumulation time is greater than 40 ms, transition to other AF modes is inhibited and the normal continuous mode is maintained. When out-of-focus is encountered three times continuously after obtaining in-focus, i.e. when the lens driving under the normal continuous AF mode can not follow the object, or when in-focus is not obtained continuously, i.e. when an object is offset from the lens position after an appropriate follow of the lens, or when the average velocity is smaller than −3 mm/s or greater than 1 mm/s, the mode changes to a moving object correction continuance AF mode.

The case where the mode is under moving object correction continuous AF will be described hereinafter. A transition to normal continuous AF mode occurs when the gain of an amplifier of a CCD is greater than ×4, when an attempt is made to drive the lens towards the terminal edge when already at a lens terminal position, when the velocity of the moving object changes and the absolute value of the average velocity is at most 0.75 mm/s, when an attempt is made to move the lens towards the direction of the prior lens drive for an amount greater than that defined by an average velocity, and when the lens is to be driven in an direction opposite to the current driving direction for more than 20 pulses.

If the object is present at a position farther than a predetermined amount from the prior position of the lens (referred to as "lost object" hereinafter), or when the object is of low contrast, the mode changes to the wait continuous AF mode.

The case where the mode is wait continuous AF will be described hereinafter. When focus detection is completed for a predetermined number of times, or when low contrast was detected two times continuously, the mode changes to the normal continuous AF mode. When the object is no longer of low contrast, or when restored from a lost object state, the mode changes to moving object correction continuous AF.

(2) Second Embodiment

Figure 25:
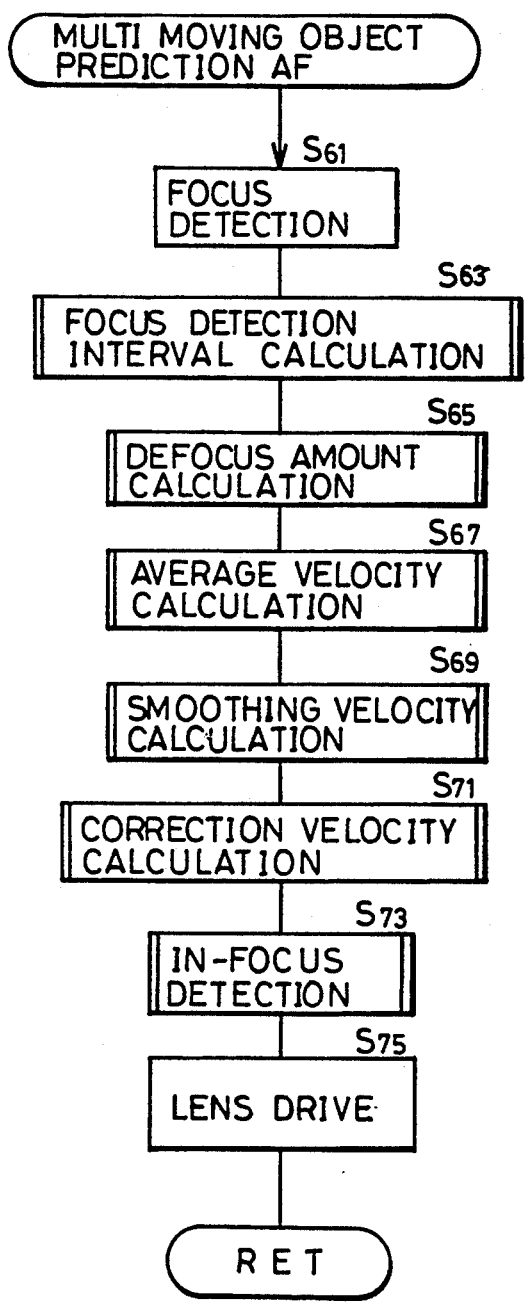
FIGS. 25 and 26 are flow charts for describing another embodiment of the present invention.
Figure 26:
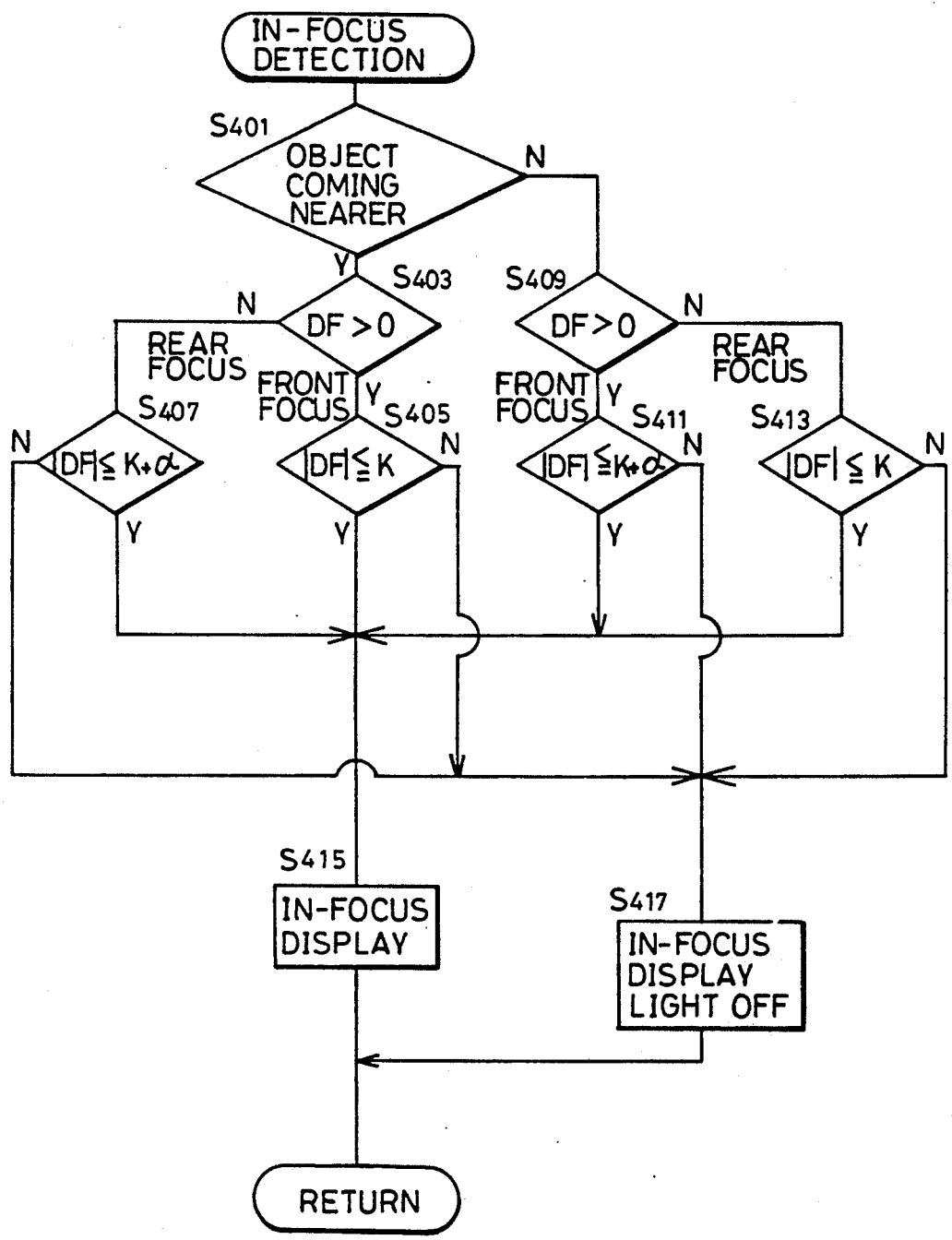

An automatic focusing device which is a modification of the above embodiment of the present invention will be described with reference to the flow charts of FIGS. 25 and 26. The flow chart of FIG. 25 is basically the same as that of FIG. 5, except that a subroutine shown in FIG. 26 is provided for step S73. As shown in FIG. 26, in the present embodiment which is an modification of the first embodiment the error is reduced occurring at the time of in-focus detection due to delay in following the moving object, by modifying the range of in-focus detection according to the direction of movement of the object. In the case where an object comes nearer to wards the camera, the range of in-focus detection of the rear focus side (object is located nearer than the in-focus position) is made wider by $\alpha$ than that K of the front focus side (object is located farther than the in-focus position). Conversely, in the case where an object moves farther away from the camera, the range of in-focus detection of the front focus side is made wider by $\alpha$ than that K of the rear focus side. The side where there is a possibility of error due to the movement of an object has its in-focus detection range enlarged to compensate for the error.

The value of $\alpha$ may be changed according to the velocity of an object. If the average velocity of an object on the image plane is vs, $\alpha = f(vs)$.

The in-focus detection range may be set so that the narrower in-focus detection range becomes identical to that of a normal stationary object.

(3) Third Embodiment

Figure 27:
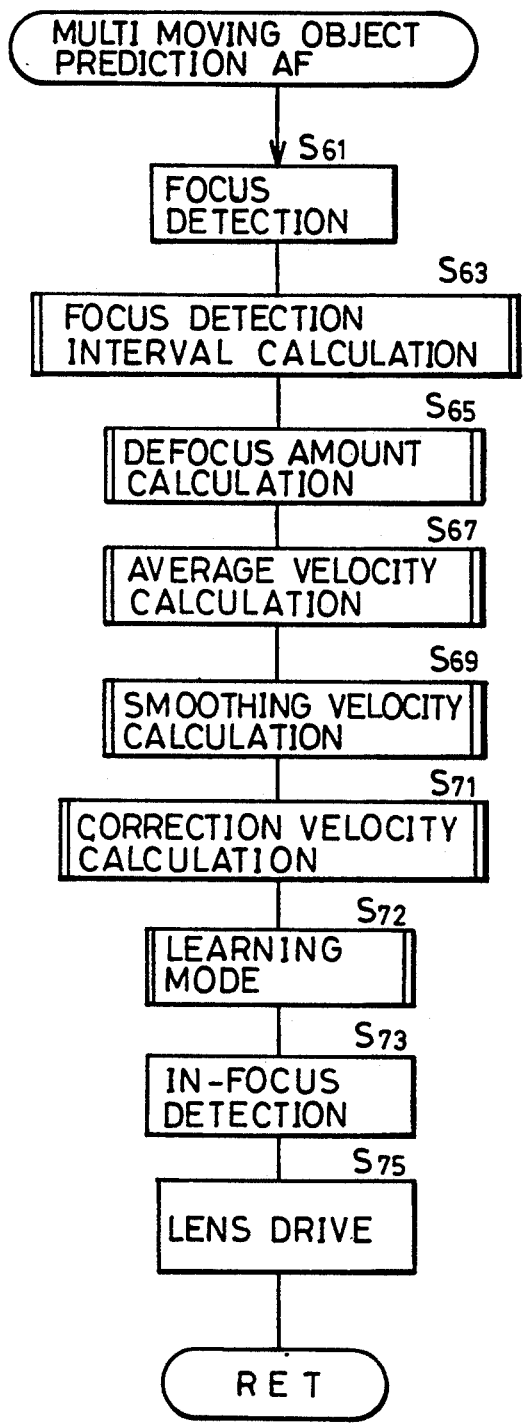
FIGS. 27 and 28 are flow charts for describing a further embodiment of the present invention.

A further embodiment which is another modification will be described hereinafter with reference to the flow charts of FIGS. 27 and 28. FIG. 27 is basically similar to that of FIG. 5, except that a subroutine of learning mode is provided after step S71.

A learning mode is efficient in the following cases. The photographing of an object making an U turn movement often includes the photographing of an repetitive identical movement. For example, in F1 races where racing cars run around the same course for a plurality of times, the racing car will repeat the movement of coming near and then moving further away from the operator of the camera in photographing the racing car from a constant position. If this movement is stored to predict the next movement according to the stored value for controlling in-focus, the amount of delay in following an object can be reduced.

Figure 28:
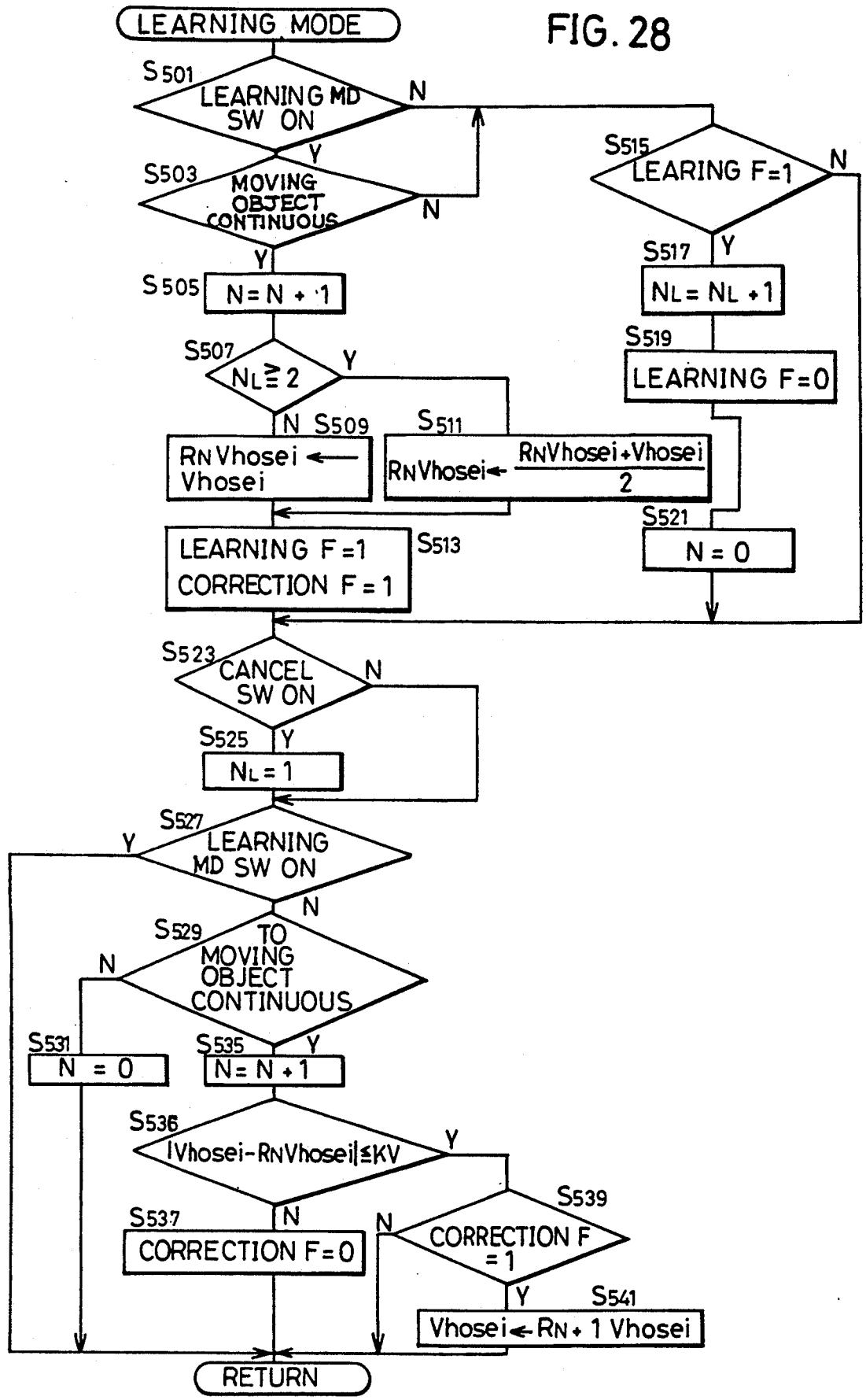

This learning mode subroutine is shown in FIG. 28. Referring to the flow chart of FIG. 28, determination is made at S501 whether a learning mode switch not shown is turned on or not. If the learning mode switch is on, determination is made at step 503 whether the mode is in moving object correction continuous mode. The learning of correction velocity Vhosei is carried out when in moving object correction continuous mode.

In order to count the number of times learning is carried out after entering the moving object correction continuous mode, 1 is added to N (S505). The program proceeds to S507 where determination is made whether NL is at least 2 or not. NL indicates the number of times a moving object correction continuous mode is entered since the learning mode switch has been turned on. If the moving object correction continuous mode is entered for the first time (NL=1), the current correction velocity Vhosei is stored as learning value RnVhosei (S509). If not the first time to enter the moving object correction continuous mode, an average value of the current correction velocity Vhosei and the already stored learning value RnVhosei is stored as the new learning value RnVhosei (S511). As long as the learning mode switch is on, an average value of the current correction velocity and an already stored learning value is stored as a new learning value every time the moving object correction continuous mode is entered. Therefore, an appropriate correction velocity will be learned gradually for an object that is repeating an identical movement. The execution of the learning of a correction velocity is followed by the set of a learning flag and a correction flag (S513).

If the learning mode switch is not turned on at S501, or the learning mode switch is on but not in moving object correction continuous mode at S503, the program proceeds to S515 where determination is made whether a learning flag is set or not. A learning flag being set means that the mode has left a moving object correction continuous mode after an execution of learning. Therefore 1 is added to NL (S517) for the next time a moving object correction continuous mode is entered. Also, the learning flag is reset (S519), and the value of N is set to 0 (S521).

In S523, determination is made whether a cancel switch not shown is turned on or not. If the cancel switch is turned on, NL is set to 1. In this case, the program proceeds to S509 after the determination of the next S507, so that the stored learning value will be reset.

Then, determination is made whether a learning mode switch is turned on or not (S527), whereby the program returns directly to the main program if the learning mode switch is turned on. Therefore, moving object correction is not carried out as long as the learning mode switch is on. If determination is made that the learning mode switch is off and the mode is moving object correction continuous mode (S529), 1 is added to N (S535), whereby the difference between the current correction velocity and the value already stored as a learning value is compared with a predetermined value (S535). If the difference is greater than a predetermined value, a correction flag is reset indicating that the learning value will be of no reference (S537). If the difference is smaller than a predetermined value, the value of the correction flag is detected (S539). If the correction flag is set, the value stored as the learning value is set as the correction velocity (S541). Because the value of the learning value of N+1 is employed as the correction velocity, the amount of delay in following an object is reduced.

Although the present invention has been described and illustrated in detail, it is clearly understood that the same is by way of illustration and example only and is not to be taken by way of limitation, the spirit and scope of the present invention being limited only by the terms of the appended claims.

We claim:

1. An automatic focusing device provided in a camera comprising:
   first means for detecting whether an acceleration of an object toward the camera is reversed;
   second means for calculating a movement amount of a photographic lens toward an in-focus position and changing a method for calculating the movement amount when the first means detects that the acceleration is reversed; and
   third means for driving the photographic lens on the basis of the calculated movement amount.

2. An automatic focus device provided in a camera, comprising:
   first means for detecting a defocus amount of a photographic lens with respect to an object;
   second means for calculating first and second kind of average of values concerning a series of the detected defocus amounts; and
   third means for detecting time when acceleration of the object towards the camera is reversed by detecting time when the two kind of average intersect each other.

3. An automatic focusing device according to claim 2, wherein the first kind of average is calculated from a series of the detected defocus amounts and the second kind of average is calculated from a series of the first average.

4. An automatic focusing device provided in a camera, comprising:
   first means for detecting a velocity of an object toward the camera;
   second means for detecting whether the detected velocity is reversed or not;
   third means for calculating a movement amount of a photographic lens toward an in-focus position on the basis of the detected velocity and changing a method for calculating the movement amount when the second means detects that the velocity is reversed; and
   fourth means for driving the photographic lens on the basis of the calculated movement amount.

5. An automatic focusing device according to claim 4, further comprising fifth means for detecting a defocus amount of the photographic lens with respect to the object, and wherein the first means detects the velocity of the object by means of detecting a velocity of the detected defocus amount.

6. An automatic focusing device provided in a camera, comprising:
   a photographic lens having an optical axis;
   first means for detecting a velocity of an image formed by the photographic lens, along the optical axis;
   second means for detecting whether the detected velocity is reversed or not;
   third means for calculating a movement amount of the photographic lens toward an in-focus position on the basis of the detected velocity and changing a method for calculating the movement amount when the second means detects that the velocity is reversed; and
   fourth means for driving the photographic lens on the basis of the calculated movement amount.

7. An automatic focusing device according to claim 6, further comprising fifth means for detecting a defocus amount of the photographic lens with respect to an object, and wherein the first means detects the velocity of the image by means of detecting a velocity of the detected defocus amount.

8. An automatic focusing device provided in a camera, comprising:
   a photographic lens having an optical axis;
   first means for detecting whether an acceleration of an image formed by the photographic lens, along the optical axis is reversed or not;
   second means for calculating a movement amount of the photographic lens toward an in-focus position and changing a method for calculating the movement amount when the first means detects that the acceleration is reversed; and
   third means for driving the photographic lens on the basis of the calculated movement amount.

* * * * *